US012754539B2

(12) United States Patent
Shiu et al.

(10) Patent No.: US 12,754,539 B2
(45) Date of Patent: Oct. 6, 2026

(54) SYSTEMS AND METHODS FOR AUTOMATED GUIDED VEHICLE CONTROL

(71) Applicant: United States Postal Service, Washington, DC (US)

(72) Inventors: Leung Man Shiu, Gaithersburg, MD (US); Erich Joseph Petre, Gainesville, VA (US)

(73) Assignee: United States Postal Service, Washington, DC (US)

( * ) Notice: Subject to any disclaimer, the term of this patent is extended or adjusted under 35 U.S.C. 154(b) by 56 days.

(21) Appl. No.: 18/587,554

(22) Filed: Feb. 26, 2024

(65) Prior Publication Data

US 2024/0192671 A1 Jun. 13, 2024

Related U.S. Application Data

(63) Continuation of application No. 17/805,414, filed on Jun. 3, 2022, now Pat. No. 11,914,354, which is a continuation of application No. 16/746,524, filed on Jan. 17, 2020, now Pat. No. 11,353,858.

(60) Provisional application No. 62/944,630, filed on Dec. 6, 2019, provisional application No. 62/794,490, filed on Jan. 18, 2019.

(51) Int. Cl.

| | |
|---|---|
| ***G05B 19/418*** | (2006.01) |
| ***B65G 1/137*** | (2006.01) |
| ***B66F 9/06*** | (2006.01) |
| ***G01S 15/04*** | (2006.01) |
| ***G05D 1/00*** | (2006.01) |
| ***G06Q 10/087*** | (2023.01) |

(52) U.S. Cl.
CPC ..... *G05B 19/41895* (2013.01); *B65G 1/1371* (2013.01); *B65G 1/1378* (2013.01); *B66F 9/063* (2013.01); *G01S 15/04* (2013.01); *G05D 1/00* (2013.01); *G06Q 10/087* (2013.01); *B65G 2203/041* (2013.01); *B65G 2203/042* (2013.01); *G05B 2219/40298* (2013.01); *G05B 2219/45063* (2013.01)

(58) Field of Classification Search
CPC .... G05B 19/41895; G05B 2219/40298; G05B 2219/45063; B65G 1/1371; B65G 1/1378; B65G 2203/041; B65G 2203/042; B66F 9/063; B66F 9/0755; G01S 15/04; G05D 1/00; G05D 1/0297; G06Q 10/087; G06Q 10/083; G06Q 50/40; B07C 5/36
See application file for complete search history.

(56) References Cited

U.S. PATENT DOCUMENTS 3,702,018 A 11/1972 Wood
4,111,452 A 9/1978 Carlsson
(Continued)

FOREIGN PATENT DOCUMENTS

CA 3136541 C 8/2023
DE 202021000626 U1 3/2021
(Continued)

*Primary Examiner* — Thomas Randazzo
(74) *Attorney, Agent, or Firm* — Knobbe, Martens, Olson & Bear, LLP

(57) ABSTRACT

Systems and methods for commanding, controlling, and guiding automated guided vehicles ("AGVs"). Automated systems translate AGV commands according to AGV manufacturers. AGVs can be summoned and destinations be determined automatically.

20 Claims, 17 Drawing Sheets

(56) References Cited

U.S. PATENT DOCUMENTS 4,786,229 A 11/1988 Henderson
5,267,719 A 12/1993 Keller
6,135,701 A 10/2000 Galloway, Sr.
6,299,001 B1 10/2001 Frolov et al.
6,691,644 B1 2/2004 Anderson
6,705,523 B1 3/2004 Stamm et al.
6,871,714 B2 3/2005 Johnson
7,533,742 B2 5/2009 Johnson et al.
9,002,506 B1 * 4/2015 Agarwal .............. G06Q 10/087 700/218
9,171,278 B1 10/2015 Kong
9,336,509 B1 * 5/2016 Arun Singhal ...... G06Q 10/087
9,387,982 B1 7/2016 Corey, Jr. et al.
9,561,941 B1 2/2017 Watts
9,792,577 B2 * 10/2017 Mountz ................ B65G 1/1378
9,827,683 B1 11/2017 Hance et al.
9,963,331 B1 * 5/2018 Holmberg ............ G05D 1/0212
10,000,284 B1 6/2018 Purwin et al.
10,539,266 B2 1/2020 Will et al.
10,733,565 B1 8/2020 Stephens
10,772,444 B2 9/2020 Stas
11,027,640 B2 6/2021 Schwartz et al.
11,028,609 B2 6/2021 Sargent
11,034,282 B2 6/2021 Barlow
11,086,336 B1 8/2021 Bolotski et al.
11,176,674 B2 11/2021 Diankov
11,250,376 B2 2/2022 Fisher
11,288,472 B2 3/2022 Rodriguez
11,353,858 B2 6/2022 Shiu et al.
11,797,022 B1 10/2023 Ballantyne
12,288,355 B2 4/2025 Takahashi
12,481,849 B2 11/2025 Ohori
2006/0273547 A1 12/2006 Holtan et al.
2010/0117333 A1 5/2010 Ceccarelli
2013/0054129 A1 2/2013 Wong et al.
2014/0074341 A1 3/2014 Weiss
2014/0262690 A1 9/2014 Henderson
2015/0032252 A1 1/2015 Galluzzo et al.
2015/0158517 A1 6/2015 Hasan
2015/0181128 A1 6/2015 Kaku
2016/0012297 A1 1/2016 Kanga
2016/0042320 A1 2/2016 Dearing
2016/0176638 A1 6/2016 Toebes
2016/0189098 A1 6/2016 Beaurepaire et al.
2017/0072558 A1 3/2017 Reynolds
2017/0086325 A1 3/2017 Connor
2017/0278051 A1 9/2017 Cohn
2017/0283171 A1 10/2017 High et al.
2017/0297820 A1 10/2017 Grinnell et al.
2018/0032949 A1 2/2018 Galluzzo et al.
2018/0053141 A1 * 2/2018 Shydo, Jr. .............. G05D 1/104
2018/0096299 A1 4/2018 Jarvis et al.
2018/0120465 A1 5/2018 Rose et al.
2018/0127212 A1 5/2018 Jarvis et al.
2018/0137454 A1 5/2018 Kulkarni et al.
2018/0137458 A1 5/2018 Repensek
2018/0150798 A1 5/2018 Wilkinson et al.
2018/0215382 A1 8/2018 Gupta
2018/0215544 A1 8/2018 High et al.
2018/0218185 A1 * 8/2018 High .................... G06Q 10/087
2018/0222262 A1 8/2018 Vetkos
2018/0276604 A1 9/2018 Gariepy et al.
2018/0307941 A1 10/2018 Holz et al.
2018/0312112 A1 11/2018 Lewis
2019/0005741 A1 1/2019 Klausner et al.
2019/0050790 A1 2/2019 Ferguson
2019/0064845 A1 2/2019 Pardasani et al.
2019/0135598 A1 5/2019 Agarwal
2019/0193629 A1 6/2019 Zevenbergen et al.
2019/0196505 A1 6/2019 High et al.
2019/0210849 A1 7/2019 High et al.
2019/0228375 A1 7/2019 Laury et al.
2019/0310645 A1 10/2019 Wu et al.
2020/0000061 A1 1/2020 Yamamoto
2020/0005226 A1 * 1/2020 Sikka ................... G06Q 10/087
2020/0023695 A1 1/2020 Niewiadomski
2020/0033118 A1 1/2020 Nguyen
2020/0034780 A1 * 1/2020 Sikka ................. G06Q 30/0202
2020/0061927 A1 2/2020 Millhouse et al.
2020/0074432 A1 3/2020 Valdman
2020/0122831 A1 4/2020 Rivaya
2020/0207167 A1 7/2020 Goncalves et al.
2020/0207250 A1 7/2020 Jarvis et al.
2020/0216299 A1 7/2020 Johnson
2020/0231185 A1 7/2020 Shiu et al.
2020/0231386 A1 7/2020 Shiu et al.
2020/0242544 A1 7/2020 Galluzzo et al.
2020/0398620 A1 12/2020 Shiu et al.
2021/0017007 A1 1/2021 Houston et al.
2021/0147202 A1 5/2021 Black
2021/0170817 A1 6/2021 Smith
2021/0358069 A1 11/2021 Lewandowski
2021/0374406 A1 12/2021 Brun
2021/0395008 A1 * 12/2021 Zheng .................... G05D 1/223
2022/0014682 A1 1/2022 Dorado
2022/0129841 A1 4/2022 Gutke
2022/0141082 A1 5/2022 Brun
2022/0187847 A1 6/2022 Cella
2022/0234403 A1 7/2022 Ward
2023/0030779 A1 2/2023 Deluca
2023/0166406 A1 6/2023 Landi
2024/0378789 A1 11/2024 Varekamp
2025/0033899 A1 1/2025 Kimura

FOREIGN PATENT DOCUMENTS

EP 3392119 A1 10/2018
WO WO 2019/110330 A1 6/2019
WO WO 2023/178287 A1 9/2023

* cited by examiner

SYSTEMS AND METHODS FOR AUTOMATED GUIDED VEHICLE CONTROL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57. This application is a continuation of U.S. application Ser. No. 17/805,414, filed Jun. 3, 2022, which is a continuation of U.S. application Ser. No. 16/746,524, now U.S. Pat. No. 11,353,858, filed Jan. 17, 2020, which claims the benefit of priority to U.S. provisional applications 62/794,490, filed Jan. 18, 2019, and 62/944,630, filed Dec. 6, 2019, the entire contents of which are hereby incorporated by reference.

BACKGROUND

Field

This development relates to systems and methods for commanding, controlling, and guiding automated or automated guided vehicles ("AGVs").

Description of the Related Art

AGVs are useful devices that allow operators to automate tasks particularly in warehouse, delivery center, or mail processing center environments. AGVs can be particularly useful for transferring items or materials from one area to another in a warehouse, a distribution facility, such as a mail processing center, or other facility. Thus, systems and methods for controlling AGVs to allow them to pick up and drop off items at appropriate locations are greatly desired.

SUMMARY

In some embodiments, the developments relate to a system that has a sensor system that can determine whether an item for transport is at a pick location. The system can have a facility management database that can determine a drop location for the item. The system can have an automated guided vehicle (AGV) computer controller that can request an AGV to pick up the item at the pick location and drop off the item at the drop location if the item is for transport.

In some embodiments, the sensor system can scan the pick location and determine if a target at the pick location is obscured by the item.

In some embodiments, the sensor system can detect and read a computer readable code on the item and determine, based at least in part on the computer readable code, whether the item is for transport.

In some embodiments, the sensor system can generate a notification if the item is not for transport.

In some embodiments, the sensor system can determine if the pick location is occupied by the item based at least in part on a threshold portion of the target being obscured.

In some embodiments, the sensor system is an ultrasonic sensor system.

In some embodiments, the ultrasonic sensor system determines that a pick location is occupied if an echo indicative of an occupied status is received for at least a predetermined duration of time.

In some embodiments, the ultrasonic sensor system has an ultrasonic transducer disposed above the pick location.

In some embodiments, the system has a camera system that can detect and read one or more computer readable codes on the item at the pick location to determine whether the item is for transport.

In some embodiments, the ultrasonic sensor system can generate a notification if the item is not for transport.

In some embodiments, the camera system can communicate detected and read computer readable code on the item to the facility management database to determine the drop location for the item.

In some embodiments, the camera system has a camera having a field of view including at least a portion of the pick area.

In some embodiments, the camera system comprises a camera directed toward an expected location of a tow device to determine whether the item is prepared for towing.

In some embodiments, a method of automating item movement within a facility is disclosed. The method can include scanning a pick location. The method can include determining that the pick location is occupied. The method can include detecting and reading a computer readable code on an item occupying the pick location. The method can include determining a drop location for the item based at least in part on the computer readable code. The method can include causing an automated guided vehicle (AGV) to pick up the item at the pick location and drop off the item at the drop location.

In some embodiments, determining that the pick location is occupied can include determining if a target at the pick location is obscured.

In some embodiments, determining that the pick location is occupied can include receiving a signal indicative of an occupied status.

In some embodiments, determining that the pick location is occupied can include receiving the signal for at least a predetermined duration of time.

In some embodiments, the method can include detecting, via a camera, a tow device on the item.

In some embodiments, the method can include requesting the AGV once a threshold number of items with the same drop location have been determined.

In some embodiments, the method can include selecting the AGV from a set of AGVs based at least in part on the vicinity of the AGV relative to the pick location.

In some embodiments, the developments relate to a system comprising: a vehicle control computer configured to select a pick location for an item to be picked up by an automated guided vehicle (AGV); mail processing equipment configured to determine an eventual delivery address of an item at the pick location; a facility management database configured to determine a drop location associated with the pick location based at least in part on the eventual delivery address; and an automated guided vehicle controller configured to instruct an automated guided vehicle to pick up an item at the pick location and drop off the item at the drop location.

In some embodiments, the vehicle control computer is configured to select a pick location by scanning a computer readable code associated with a pick location.

In some embodiments, the system can further comprise a route management database configured to store the location and status of each automated guided vehicle of a set of automated guided vehicles and to select an automated guided vehicle to be instructed by the automated guided vehicle controller based at least in part on the selected pick location and the locations and status of the automated guided vehicles.

In some embodiments, the automated guided vehicle is selected at least in part based on the vicinity of the location of each automated guided vehicle to the pick location and the status of each automated guided vehicle includes whether or not the automated guided vehicle is currently transporting an item.

In some embodiments, the developments relate to a system comprising: an optical sensor system configured to determine whether an item for transport is at a pick location; mail processing equipment configured to determine an eventual delivery address of the item at the pick location; a facility management database configured to determine a drop location associated with the pick location based at least in part on the eventual delivery address; and an automated guided vehicle controller configured to instruct an automated guided vehicle to pick up the item at the pick location and drop off the item at the drop location.

In some embodiments, the optical sensor system is configured to: view a pick location from above the pick location; determine if the pick location is obscured by any item; detect a computer readable code on the item; and determine, based at least in part on the machine readable code, whether the item is for transport.

In some embodiments, the optical sensor system is further configured to generate a notification if the item is not for transport.

In some embodiments, the optical sensor system is further configured to determine if the pick location is obscured by an item based at least at part on the proportion of the pick location is obscured.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

DETAILED DESCRIPTION

In some embodiments, AGVs can be used to transport items, such as boxes, pallets, or other containers to and from locations in warehouse, distribution facility, delivery center, or mail processing center environments. AGVs can be if multiple types, such as "tuggers" that can tug rolling stock or otherwise moveable items, pallet jacks that can lift pallets, and forklifts that can lift and carry items. The AGVs can transport items to and from designated pick/drop locations as required to meet operational requirements, to improve efficiency, and to increase safety.

The term item, as used herein, can include pallets, wiretainers, cloth bins, bags, sacks, pouches, trays, hampers, over-the-road containers, racks, nutting trucks, shelves, rolling stock, carts, trucks, conveyors, packages, parcels, mailpieces, and the like. The term item can also be used to refer to a combination of these items, such as a pallet of trays, nested containers, etc. It will be understood that the term item is not limited to these examples.

Figure 1:
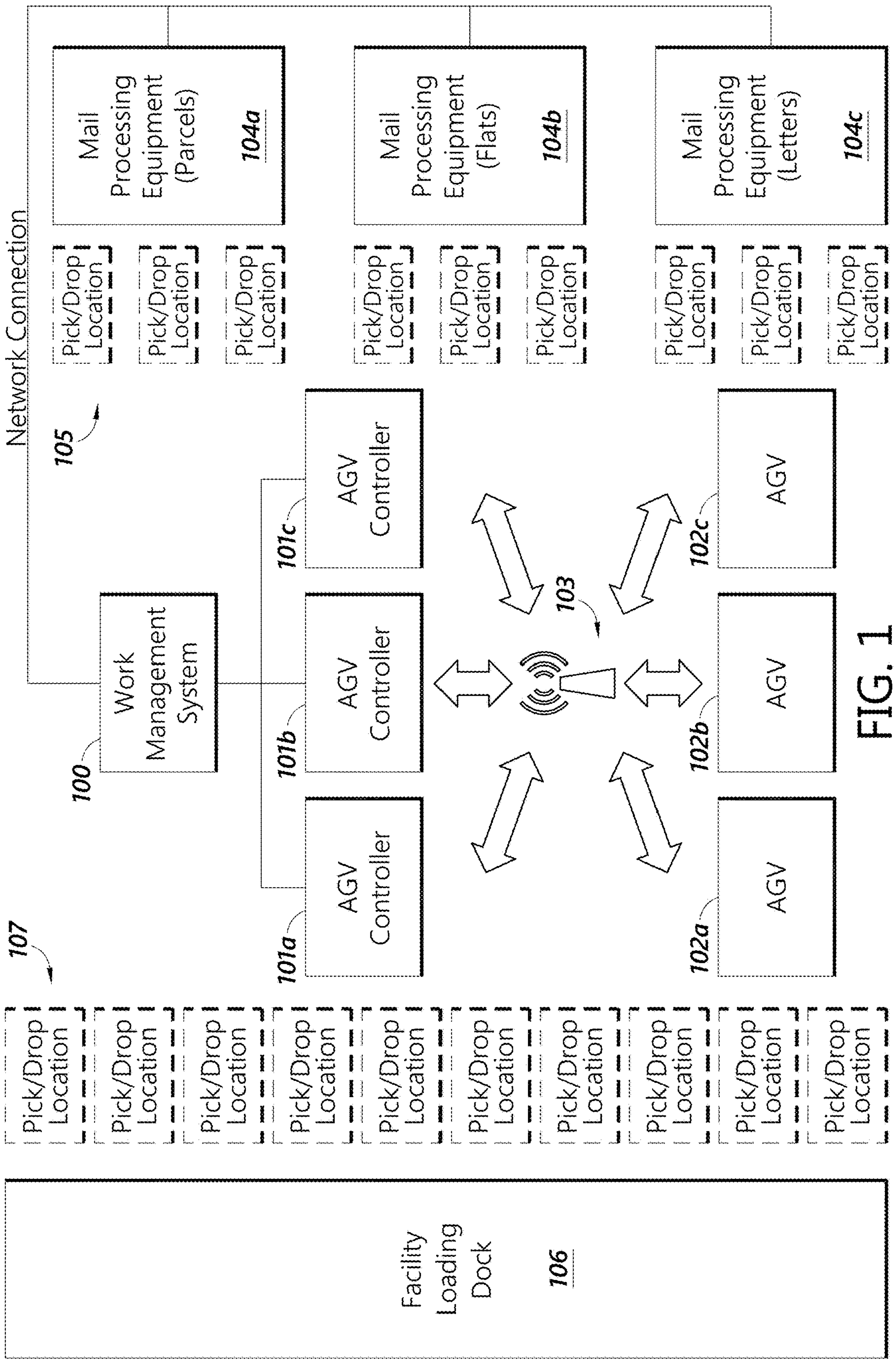
FIG. 1 shows an exemplary system diagram for AGV control in a mail processing center environment.

FIG. 1 displays one exemplary environment in which AGVs can be used with an AGV control system, specifically a mail processing facility. It is to be understood that the environment is only exemplary and the described system can be operated in any environment that requires the transportation of items from one location to another. In the environment, work management system 100 is responsible for managing the work done by AGVs. In some embodiments, the work management system can receive requests for AGVs to pick up and drop of items, assign AGVs to various tasks, and manage route conflicts between AGVs. In some embodiments, the work management system 100 can command AGVs 102*a-c* to perform tasks through AGV controllers 101*a-c*. The AGV controllers 101*a-c* can communicate with the AGVs 102*a-c* through a wireless network 103. In some embodiments, any number of AGVs and AGV controllers can be used. In some embodiments, AGVs 102*a-c* can be manufactured by different AGV manufactures and require different control protocols. In those embodiments, the AGV controllers 101*a-c* can individually be responsible for handling separate control protocols. For example, AGV 102*a* could be manufactured by Seegrid and AGV controller 101*a* can communicate with the work management system 100 and the AGV 102*a* via a Seegrid or AGV specific protocol, while the other AGVs 101*b-c* can be manufactured by different manufactures and AGV controllers 101*b-c* can communicate with the work management system 100 and the AGV 102*a* using different protocols.

The work management system 100 is in communication, for example, via a network connection, with mail processing equipment 104*a-c*. Mail processing unit 104*a-c* can include machines or groups of machines that are used to process mail items for delivery, such as feeders, sorters, facers, cancellers, etc. In some embodiments, the mail processing units can sort item that are placed into pick/drop locations 105 and, when sorted, place the items back into pick/drop locations 105. AGVs 102*a-c* can pick up and drop off items at pick/drop locations 105 to assist the mail processing units 104. As explained further below, in some embodiments, the mail processing equipment can request pick up and drop off of items from AGVs from work management system 100 through the network connection between work management system 100 and mail processing equipment 104*a-c*.

The environment in FIG. 1 also includes a facility loading dock 106, where trucks or other vehicles or item carriers can drop off items to be sorted by the mail processing equipment and then later pick up items that have been sorted by the mail processing equipment. In some embodiments, the facility loading dock can be a staging area for items, a way station for item en route through a facility or the distribution network, a storage area, or an intake area for staging items in anticipation of additional processing on mail processing equipment.

In some embodiments, the loading dock 106 can be associated with pick/drop locations 105/107. In some embodiments, the AGVs 102*a*-102*c* transport items between and among the plurality of pick/drop locations 105/107. The pick/drop locations 105, 107 can include or can be defined areas indicated on a floor of the facility, on a floor plan of a facility, can be staging areas for loading on to vehicles, in to mail processing equipment, and the like. In some embodiments, particular ones of the pick/drop locations 105/107 correspond to specific features of the facility, such as mail processing equipment, loading dock bays, vehicles, storage areas, and the like. In some embodiments, the pick/drop locations 105/107 are not specifically indicated within the facility with a marking, but are sections, areas, or portions of the facility where items may be picked up and/or dropped off. As used with regard to FIG. 1, and in an exemplary fashion, pick/drop locations 105 are associated with mail processing equipment 104*a*-104*c*, such as output or outlet areas, or inlet or input areas for the mail processing equipment 104*a*-104*c*. The pick/drop locations 107 correspond to a loading dock section of the facility proximate or as part of the facility loading dock 106. This usage is exemplary only and for convenience. One skilled in the art, guided by this disclosure will understand that pick/drop locations can correspond to any portion of a facility, network, or environment where it may be desirable or advantageous to pick-up or drop off an item.

Figure 2:
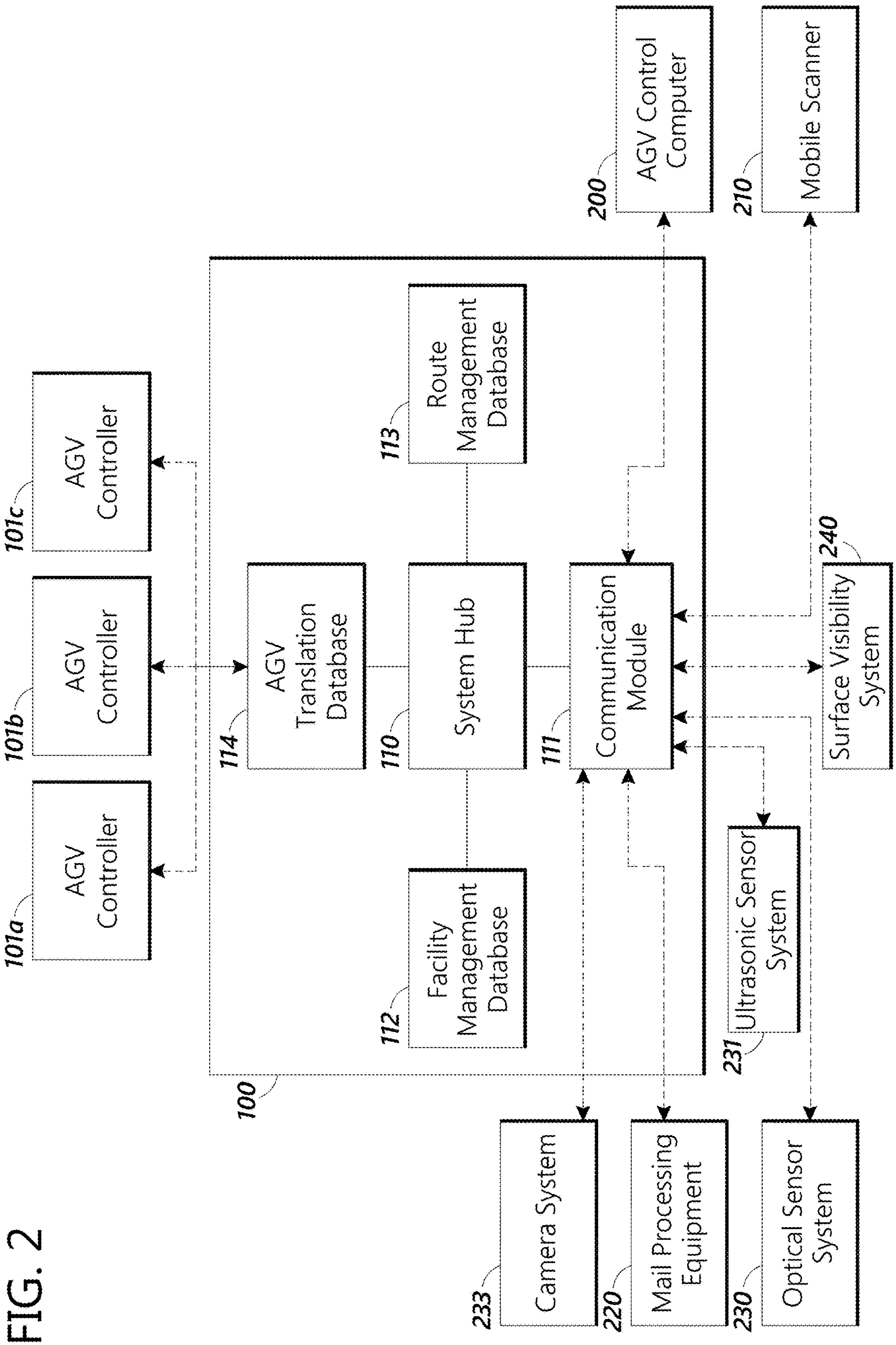
FIG. 2 shows an exemplary system architecture for one embodiment of a work management system for use in controlling AGVs.

FIG. 2 displays an exemplary system architecture for one embodiment of the work management system 100 for use in controlling AGVs. As shown in FIG. 2, work management system 100 comprises a system hub 110, a communications module 111, a facility management database 112, a route management database 113, and an AGV translation database 114. These components are interconnected and are in communication with each other via the system hub 110, or via separate connections. The system hub 110 may comprise or be a component of a processing system implemented with one or more processors. The system hub 110 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 110 may comprise a processor such as, for example, a microprocessor, such as a Pentium®) processor, a Pentium® Pro processor, a 8051 processor, a MIPS® processor, a Power PC® processor, an Alpha® processor, a microcontroller, an Intel CORE i9®, i7®, i5®, or i3® processor, or combination of cores, an AMD Ryzen®, Phenom®, A-series®, or FX® processor, or any other type of microprocessor. The processor typically has conventional address lines, conventional data lines, and one or more conventional control lines and comprise one or more cores. The processor may be in communication with a processor memory, which may include, for example, RAM memory, flash memory, ROM memory, EPROM memory, EEPROM memory, registers, hard disk, a removable disk, a CD-ROM, or any other form of storage medium known in the art. The processor memory may include, for example, software, at least one software module, instructions, steps of an algorithm, or any other information. In some embodiments, the processor performs processes in accordance with instructions stored in the processor memory.

The system hub 110 comprises a system memory configured to store information, such as delivery object assignments, ownership information and the like. The system memory may comprise a database, a comma delimited file, a text file, or the like. The system hub 110 is configured to coordinate and direct the activities of the components of the work management system 100, and to coordinate generating delivery item associations and delivery item ownership data.

In some embodiments, the system hub 110 can further comprise displays, input devices and other user interface components to allow a user to operate the system. For example, the system could comprise a keyboard, mouse, and computer display. In some embodiments, the display could display, for example, a map of the facility, the locations of all the AGVs in the facility and the current routes that AGVs are acting on.

In some embodiments, system hub 110 is in communication with communication module 111. In some embodiments, the communication module 111 may comprise a processor, memory, databases, address and control lines, and other components similar to those described herein for the system hub 110. In other embodiments, the communication module 111 may be configured to use the processor, memory, databases, address and control lines, and other components of system hub 110, or a combination of its own components and the system hub 110's components.

The communication module 111 is responsible for communications between the work management system 100 and other devices via wired and/or wireless communication. In some embodiments, the communication module 111 communicates via telephone, cable, fiber-optic, or any other wired communication network. In some embodiments, the communication module 111 may communicate via cellular networks, WLAN networks, or any other wireless network. In some embodiments, the communication module can be used by any component of system 100 to communicate with devices outside of the work management system 100.

The system hub 110 is in communication with the facility management database 112. In some embodiments, the facility map database 112 may comprise a processor, memory, databases, address and control lines, and other components similar to those described herein for the system hub 110. In other embodiments, the facility map database 112 may be configured to use the processor, memory, databases, address and control lines, and other components of system hub 110, or a combination of its own components and the system hub 110's components.

In some embodiments, facility management database 112 can contain information regarding the layout or map of the facility as well as mapping or mapping logic to determine locations where AGVs should pick up and drop off items. For example, the facility management database 112 can contain a map of the facility including locations, footprints, and/or coordinates of obstacles, paths, pick/drop locations, mail processing equipment, and the like, that an AGV could encounter. The facility management database 112 can store a unique map or facility overview for each facility. The facility management database 112 can store common pick/drop locations in geospatial coordinates or in coordinates based on or appropriate for the particular facility. The facility management database 112 can store reference points or identifiers corresponding to AGV control computers 200, for summoning or calling AGVs 101*a-c* to a location associated with the computing device. This will be described in greater detail below. In some embodiments, the facility management database 112 is configured to receive updated information from AGVs 102*a-c* as they move through the facility. This map could be sent on to the AGVs through the AGV controller's 101*a-c* to assist AGVs in navigating the facility.

In some embodiments, the facility management database 112 can also be used to map pick locations to their appropriate drop locations where AGVs can pick up and drop off items. For example, a user of the work management system 100 could create a predetermined or standard list of pick locations and corresponding drop locations. In some embodiments, items picked up at one location may frequently be dropped off at another location. This would allow users of the system to assign an AGV to perform a task by only designating a pick location and not a drop location. For example, a piece of mail processing equipment may routinely output items intended for the same destination. The destination may normally be assigned to a specific area of the loading dock. Thus, when an AGV is summoned to the pick location at this piece of mail processing equipment, the drop destination can be set by default to the specific are of the loading dock.

In some embodiments, the facility management database 112 can create a dynamic mapping between pick and drop locations. For example, in the case of a mail processing facility, the facility management database 112 can receive information about the eventual location that item will delivered to (e.g. the delivery address of a piece of mail) and the current pick location from the mail processing equipment 220. The facility management database 112 can also receive information about incoming delivery vehicles arriving at the facility from a system such as the surface visibility system 240. The surface visibility system 240 can track the location of surface transportation items within the distribution network, including predicted or estimated times the surface transportation will arrive at the facility, and the contents of the transportation vehicle. The system could then dynamically map the pick location received from the mail processing equipment to a drop location at the appropriate place on the loading dock where the vehicle that will be transporting the items will be arriving. The management could do a similar type of mapping based on vehicles delivering items that need to be delivered to the mail processing equipment 220.

The facility management database 112 can store information regarding each item within the facility, including item contents, item weight, item size, item location within the facility, item type, and any other desired item information. In some embodiments, the facility management database 112 can also store a unique alpha-numeric or other code that correspond to a specific item. This item information can be stored in a record or associated with a record which is identifiable by the unique code. The facility management database 112 can also store identifiers for other objects at the various pick/drop locations. In some embodiments, this code can be transmitted to AGVs and also be printed in a machine readable format on the package, object, and/or item. Then, when the AGV approaches the object/item, they can scan this code using an on-board scanning device to confirm that they are picking up the correct package. In some embodiments, the AGV can use a camera or other optical sensor mounted on the AGV to scan codes mounted on packages. In some embodiments, the AGV can manipulate the camera or other optical sensor's field of view to allow for more accurate scanning of machine readable codes. In some embodiments, the AGV can adjust the horizontal or vertical position of the optical sensor or camera to improve its abilities to scan the machine readable code.

In some embodiments, the AGV can continually scan in front of it to determine if an object/item could have a machine readable code on it. If there is a possible code on the object/item, the machine readable code can then continually adjust the field of view and vertical or horizontal position of the camera or optical sensor to allow the camera or sensor to scan the code as the AGV approaches the machine readable code. In some embodiments, if the AGV sense multiple available machine readable codes that it could scan, it can adjust the camera or optical sensor to scan all of the available codes, and then determine which code corresponds to the package that the AGV will pick up. This information can then be used to guide the AGV to the appropriate package.

In some embodiments, system hub 110 is in communication with route management database 113. In some embodiments, the route management database 113 may comprise a processor, memory, databases, address and control lines, and other components similar to those described herein for the system hub 110. In other embodiments, the route management database 113 may be configured to use the processor, memory, databases, address and control lines, and other components of system hub 110, or a combination of its own components and the system hub 110's components.

In some embodiments, route management database 113 can store common routes of travel within the facility. The route management database 113 can store the real-time location of each AGV within the facility, and the location of any trackable human operated vehicles within the facility. The route management database 113 can determine the most appropriate AGV to handle a specific AGV request and to handle any potential route collisions between AGVs including advance mapping of routes to maximize efficiency. In some embodiments, the route database 113 can know the current location of every AGV in the system either by having AGVs report their location or using a system such as locating system such as that described in U.S. Provisional application No. 62/660,775, filed Apr. 20, 2018. In some embodiments, the AGVs can also report whether they are currently delivering items between pick and drop locations and what their planned route is. The route management database 113 can then use this information to select an appropriate AGV and to handle any route conflicts.

For example, when the work management system 100 receives a request for an AGV, route management database 113 can assign an AGV to the request base on which AGVs are currently busy, what kind of load will be picked up, the distance of the various AGVs to the pick location, the battery life of the various AGVs and any anticipated future need of the AGV. For example, if the work management system 100 receives a request that can be handled by any type of AGV it could prioritize assigning the type of AGV that the facility has the most of. In some embodiments, the route management database 113 can also calculate an expected arrival time for every AGV to any particular pick/drop location in order to allow the route management database 113 to assign AGVs based on the expected arrival time for every AGV. For example, the route management database 113 can assign AGVs to pick up loads based on which AGVs have the shortest arrival times. In some embodiments, the estimated arrival times can be shared with components that request AGVs.

Once the route management database 113 picks the assigned AGV, the route management database can request a planned route from an AGV. The route management database 113 can then see if the planned route conflicts with any other AGV routes received by the system. The route management database 113 can then handling any potential collisions by requesting one or more AGVs change their route. The route management database 113 can determine which AGV should change their route based on various factors. For example, the route management database can require AGVs that are carrying loads with a lower priority (e.g. do no need to be delivered as fast) to change, or require the AGV that has made the least progress on its route change.

In some embodiments, system hub 110 is in communication with AGV translation database 114. In some embodiments, the AGV translation database 114 may comprise a processor, memory, databases, address and control lines, and other components similar to those described herein for the system hub 110. In other embodiments, the AGV translation database 114 may be configured to use the processor, memory, databases, address and control lines, and other components of system hub 110, or a combination of its own components and the system hub 110's components.

In some embodiments, the work management system 100 can be responsible for directing AGVs of various manufactures using different communications modules. In these embodiments, the AGV translation module 114 is responsible for translating the work management system 100's commands to the appropriate communication module. For example, the work management system 100 could send a “material move request” or “item transport request” to the AGV translation module 114 intended for communication to an AGV of a certain type and made by a certain manufacturer. The AGV translation module 114 can translated the request into an appropriate message for that AGV. If the same command is this sent to an AGV made by a different manufacturer, the AGV translation module 114 could then translate it into an appropriate message for that AGV and so on and so forth.

In some embodiments, the work management system 100 is in communication with an AGV control computer 200 through communication module 111. In some embodiments, AGV control computer can take the form of a tablet computer or other mobile computer. In some embodiments, the AGV control computer 200 can display a map of the facility with all the possible pick/drop locations. In some embodiments, a user of AGV control computer 200 can select pick/drop locations on the screen to request an AGV transport items between the two locations. The AGV control computers 200 can be fixed or mounted at known locations within the facility. These locations can be common locations such as near mail processing equipment 220, loading docks, or any other desired position. The AGV control computers 200 can summon an AGV to their known location upon inputting the appropriate command. The AGV control computer can also include an input for setting the AGV destination location. The location of the AGV control computers 200 within the facility can be tracked and stored in a memory, such as the facility management database 112.

In some embodiments, the work management system 100 is in communication with a mobile scanner 210. In some embodiments, the mobile scanner 210 is a handheld device that can be used to scan computer readable codes such as barcodes. The mobile scanner 210 can be carried by distribution network personnel working in the facility. The personnel can scan a code on an item to summon the AGV to the location of the item. In some embodiments, the mobile scanner 210 can request an AGV by scanning a machine readable code that corresponds to a particular pick location and then scanning a machine readable code that corresponds to a particular drop location. In some embodiments, the mobile scanner 210 can instead scan a particular item that needs to be transported by an AGV. The system can then automatically determine a where the item needs to be picked up from and then determine the drop location using facility management database 112.

In some embodiments, the work management system 100 is in communication with an optical sensor system 230. In some embodiments, the optical sensor system 230 can be a system of cameras or other optical sensors mounted on the ceiling of the facility or in another location offering a higher vantage point of an area of the facility. The sensors can be used to determine when items that need to be picked up and dropped off are present in a particular pick/drop location 105/107. For example, in some embodiments, machine readable targets can be painted, outlined, defined, or otherwise placed on particular pick/drop locations 105/107 or in an area of the facility. The sensor system can determine when an item is present in a pick/drop location 105/107 based on whether a particular target is obscured from the system. For example, if an item is placed on a pick location, the item will obscure the target and the optical sensor system 230 will determine that an item for pick up is present. In some embodiments, the optical sensor system 230 can determine if an item is present if some percentage of the target is obscured, such as 40, 50, or 80%. In some embodiments, the optical sensor system 230 can further determine if an item is present by sensing if there is a particular target or code, such as a machine readable code, located in a pick/drop location 105/107. If a code is present, as would be the case where a pallet having a computer readable code on a label attached to the top, side, or other surface of the pallet, is located on or near a target, then the optical sensor system 230 knows that the item obscuring a pick/drop location 105/107 is in fact an item for pick up or drop off and by reading the code, the optical sensor system 230 can communicate the code to the system hub 110. The work management system 100 can then determine the identity of the item, and summon an AGV to transport the item, as required, and according to a facility plan or routing plan for that item. In some embodiments, the optical sensor can submit this code to the work management system 100 and it can use this information to identify the particular item and then further use this information with facility management database 112 to determine a drop location for the item. For example, if the code identifies the item as an incoming package, the system could know to drop off the object/item at the mail processing equipment that processes packages. If the code identifies an item which requires a coarse sort, transportation to the loading dock, etc., the work management system 100 can determine what the proper destination for the item within the facility should be.

In some embodiments, the work management system 100 is in communication with an ultrasonic sensor system 231. In some embodiments, the work management system 100 is in communication with the ultrasonic sensor system 231 and not in communication with the optical sensor system 230. In some embodiments, the ultrasonic sensor system 231 can include one or more of ultrasonic transducers (sometimes referred to as ultrasonic sensors) and/or other presence or proximity detection devices positioned above an area of the facility. The ultrasonic transducers can be positioned at an operable height above a floor of the area of the facility. For example, in some embodiments, the ultrasonic transducers can be positioned at a height of 9-12 feet above the floor of the area of the facility, which can conveniently be accessed for maintenance (e.g., at an accessible height with a ladder). Other heights can be used, however, such as less than 8, 10, 15, or greater than 15 feet, or any other desired height, depending on the operable ranges of the ultrasonic transducer.

The ultrasonic transducers can be used to determine when items that need to be picked up and dropped off are present in a particular pick/drop location 105/107. For example, in some embodiments, an ultrasonic transducer can be positioned at each pick/drop location 105/107 or other areas of the facility. The ultrasonic sensor system 231 can determine when an item is present in a pick/drop location 105/107 by sending a sound pulse (e.g., sound, sound wave, signal), which can be above the range of human hearing (ultrasonic), toward the floor of the pick/drop location 105/107 and receiving a sound echo in return. The ultrasonic sensor system 231 can detect a variety of item types, including wire containers.

The ultrasonic sensor system 231 can detect the presence or absence of an item. For example, the ultrasonic sensory system 231 may identify a sound echo indicative of the absence or presence of an item. In some embodiments, the ultrasonic sensor system 231 measures the distance between the reflective surface and the ultrasonic transducer such that a reflective surface closer than the floor is indicative of an item being present. In some embodiments, the ultrasonic sensor system 231 sets a base line associated with the sound pulse reflecting off the floor to indicate that no item is present and makes an "item present" determination upon receiving an echo indicative (e.g., shorter travel distance, shorter time period between sound emission and echo receipt) of a reflecting surface that is different than the floor, which can include closer.

In some embodiments, the ultrasonic sensor system 231 measures the time between sending the sound pulse and receiving an echo, which can also be representative of the distance between the ultrasonic transducer and the surface against upon which the sound pulse is reflecting. A longer time period between the sending of the sound pulse and receiving the echo can indicate that no item is present because the sound pulse reaches the floor before being reflected back (e.g., a larger distance between the ultrasonic transducer and the reflecting surface compared to when an item is present). In contrast, a shorter time period between the sending of the sound pulse and receiving the echo can indicate that an item is present because the sound pulse is reflected back before reaching the floor (e.g., a shorter distance between the ultrasonic transducer and the reflecting surface compared to when the sound pulse reflects off the floor). A range of time periods, threshold time, and/or time period between sending the sound pulse and receiving the echo can be indicative of the presence or absence of an item. A range of distances, threshold distance, and/or distance measured by the ultrasonic sensor system 231 between the ultrasonic transducer and the reflective surface (e.g., item, floor, etc.) can be indicative of the presence or absence of an item.

In some embodiments, the ultrasonic sensor system 231 receives an echo indicative of the absence or presence of an item for a duration of time before an absence/presence determination is made, which can include receiving an echo for a duration of time that is less than 0.1, 0.5, 2, 3, 3.5 seconds, or greater, or any other desired time duration. This can advantageously avoid or decrease false absence/presence determinations that could result from objects temporarily passing under the ultrasonic transducer. In some embodiments, the ultrasonic transducer system 231 distinguishes a sound echo indicative of the absence or presence of an item by comparing the received echo against a database of reference echoes indicative of the absence of an item, presence of an item, type of item, and/or status of an item (e.g, whether the item is carrying parcels). Upon detecting of an item, the work management system 230 can summon an AGV to transport the item, as required, and according to a facility plan or routing plan.

In some embodiments, the work management system 100 is in communication with a camera system 233. In some embodiments, the camera system 233 includes one or more cameras and/or other optical sensors that are directed toward the pick/drop location 105/107. The one or more cameras can detect a computer readable code, information, and/or identifier on a label or placard attached to an item and communicate the code to the system hub 110. In some embodiments, the one or more cameras can detect a towing device (e.g., tow bar) coupled to the item and communicate the presence or absence of the towing device to the system hub 110. In some embodiments, if an item is determined to be present by the ultrasonic sensor system 231 in a pick/drop location and the camera system 233 detects a computer readable code on a placard attached to the item, the work management system 100 can determine that the detected item is in fact an item for pickup or drop off. In some embodiments, if an item is determined to be present in a pick/drop location by the ultrasonic sensor system 231 and the camera system 233 does not detect a computer readable code on a placard, the work management system 100 can determine that the detected item is not an item for pickup or drop off and generate an alert, which can prompt the removal of the detected item. The work management system 100 can determine the identity of a detected item with the detected computer readable code and summon an AGV to transport the item, as required, and according to a facility plan or routing plan for that item. In some embodiments, the camera system 233 can submit the detected code to the work management system 100, which can use the information to identify the particular item and use the information with the facility management database 112 to determine a drop location for the item. For example, if the code identifies the item as an incoming package, the system 100 can know to drop off the object/item at the mail processing equipment 220 that processes packages, parcels, etc. If the code identifies an item which requires a coarse sort, transportation to the loading dock, etc., the work management system 100 can determine what the proper destination for the item within the facility should be.

In some embodiments, the work management system 100 is also in communication with the various mail processing equipment 220. In some embodiments, mail processing equipment 220 can request an AGV when the mail processing equipment has filled a particular pick/drop location with an item. In some embodiments, the mail processing equipment can request an AGV based on how much time is left before the mail processing equipment fills a pick/drop location and the estimated arrival time for an AGV. In some embodiments, the mail processing equipment can communicate the eventual destination for the items it processes to the work management system 100 and the work management system 100 can use the facility management database 112 to determine the appropriate drop location for the items processed by the mail processing equipment 220.

Figure 3:
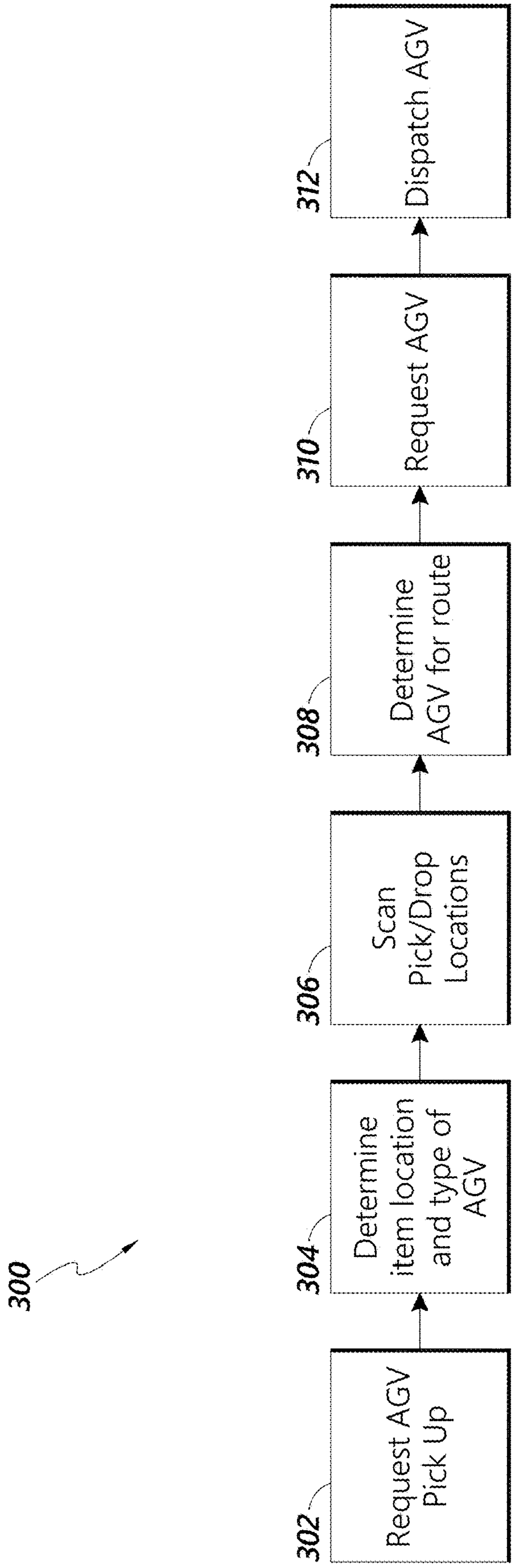
FIG. 3 shows an exemplary process for using an AGV control computer to request that AGVs transport appropriate items.

FIG. 3 shows an exemplary process for using an AGV control computer 200 to request that AGVs transport appropriate items. A process 300 begins in step 302, wherein an AGV pick-up is requested. The AGV pickup can be requested, for example, by selecting an appropriate soft key or button on the AGV control computer 200. In some embodiments, an AGV control computer 200 is assigned to a single pick/drop location 105/107, such as a pick/drop location 105 near or at mail processing equipment. In some embodiments, an AGV control computer 200 can correspond to or be usable for a plurality of pick/drop locations 105/107. Where an AGV control computer 200 is located in a common area, for example, it can be used in conjunction with items in a plurality of pick/drop locations 105/107.

The user, such as distribution network personnel may receive a signal that an item is required for pickup. For example, an operator of mail processing equipment may complete an operation and an item is ready for transportation to another part of the facility. The operator can access an interface on the AGV control computer to request a pickup of the item. If the AGV control computer 200 is associated with a single pick/drop location 105/107, the request can be sent to the work management system 100 that an item is ready for pickup at the pick/drop location 105/107 associated with the AGV control computer. In some embodiments, where the AGV control computer 200 is associated with more than one pick/drop location 105/107, the operator can select the one of a plurality of pick/drop locations 105/107 where the item for pickup is located.

The process 300 moves to step 304, wherein the item location and required AGV type is determined by the work management system 100. When the request is received by the AGV control computer 200, a pick/drop location 105/107 can also be sent. The facility management database 112 can store coordinates of the pick/drop locations 105/107, the system hub 110 can query the facility management database 112 using the location provided by the AGV control computer 200, and the facility management database 112 can provide the coordinates of the item to be picked up to the AGV via the AGV translation database 114 and to the AGV controllers 101*a*-101*c*.

In some embodiments, the type of AGV required to move a certain item can be associated with the pick/drop location 105/107. For example, a certain piece of mail processing equipment 220 may always output the same type of item, for example, a bin, hamper, pallet etc. The output of the mail processing equipment 200 can generally go to a specified pick/drop location 105/107. Thus, when an AGV is requested, the work management system 100 can, based on the pick/drop location 105/107, identify the proper type of AGV to transport the item. In some embodiments, the type of AGV can be selected on the AGV control computer 200 by the operator. In some embodiments, as will be described elsewhere herein, the type of AGV required to transport the load may be encoded within or associated with the code on the item.

The process 300 moves to step 306, wherein the AGV drop location is selected. An operator can select a drop location on the AGV control computer 200. In some embodiments, the drop location can be selected based on the pick location. This will be described in greater detail with regard to FIG. 4.

The process moves to step 308, wherein the route for the AGV is determined requested. When the work management system 100 has determined the pick location, the drop location, and the type of AGV required, the work management system 100 determines the route for the AGV. Determining the route for the AGV can include assessing the locations of all AGVs within the facility and determining which AGV of the correct type is the proper, best, or ideal AGV to complete the route. For example, the work management system can evaluate which AGV several factors: which AGV is closest to the pick location, which AGV has sufficient battery capacity to move to the pick/drop location 105 to pick up the item and move to the pick/drop location 107 to drop off the item; which AGV of the correct type will be nearest the pick/drop location 105 when the AGV completes its current mission; AGV size and speed based on the selected route; obstacles along the proposed route; and any other desired parameter. The route for the chosen AGV is determined based on the pick/drop location 105 where the pickup is to occur and the pick/drop location 107 where the drop off is to occur; the location of other AGVs, the priority of the item to be picked up, etc. if an item has high priority, for example, if the item is valuable, has a high class of service, is in danger of missing a service class time window, etc., these factors can also be considered. The work management system 100 may halt or pause other AGV operations where an item has a high priority, in order to expedite or maximize efficiency of the AGV which will transport the high priority item.

The process 300 moves to step 310 wherein the AGV is requested. The system hub 110 can pass a signal to the AGV translation database 114 for the selected AGV. The signal can include the coordinates or identifiers of the pick/drop locations 105/107 for pickup and drop off, any time, speed, or other requirements or constraints, and AGV type. The AGV translation database 114 can translate the operating instructions form the system hub 110 into the correct format or language for the selected type of AGV.

The process 300 moves to step 312, wherein the AGV translation database 114 sends the information in the correct language or format, to the selected AGV controller 101*a-c*, and the AGV controller 101*a-c* sends instructions to the AGV 102*a-c* to accomplish the operation. The process 300 then ends.

Figure 4:
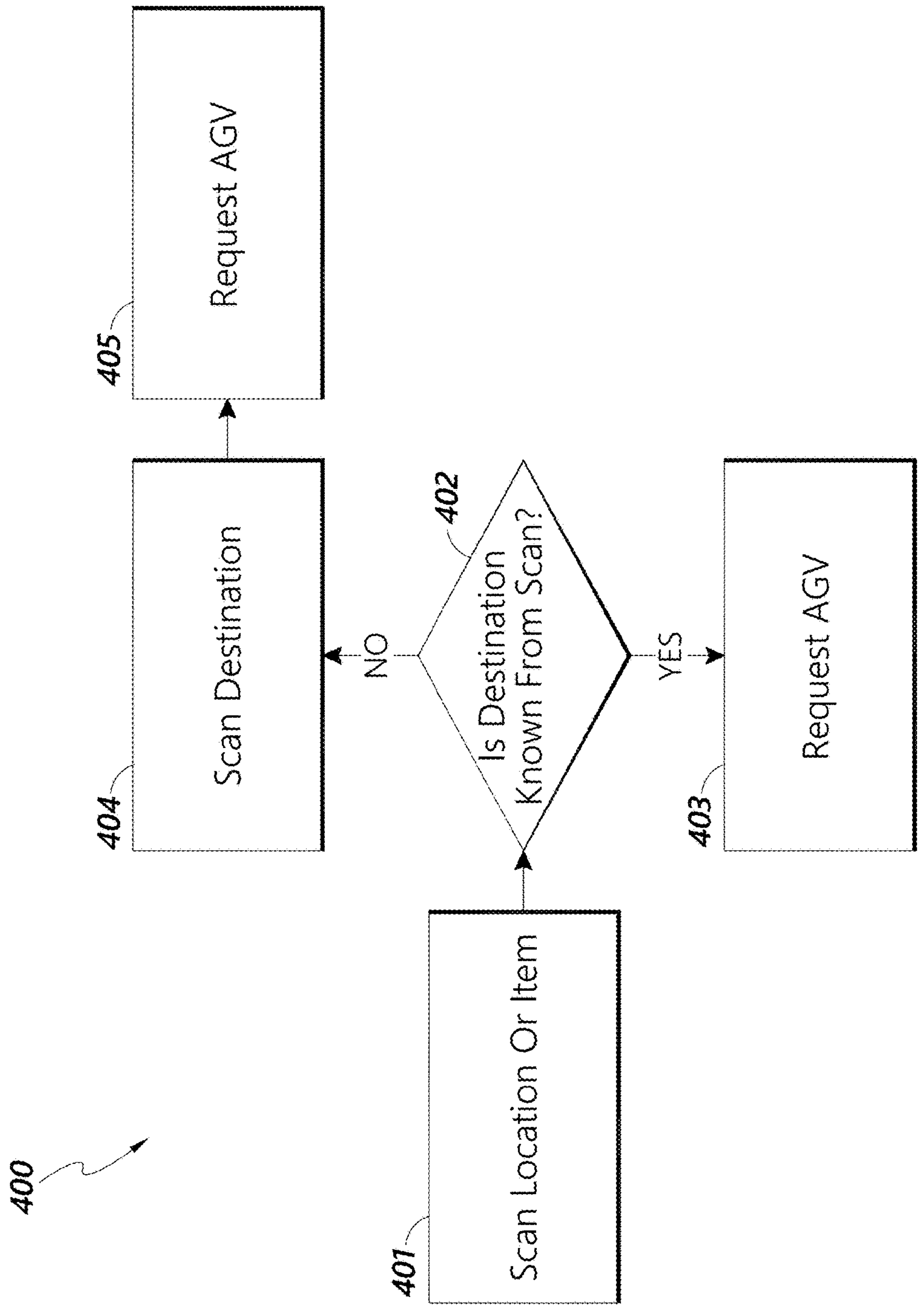
FIG. 4 shows an exemplary process for using a mobile scanner to request that AGVs transport appropriate items.

FIG. 4 shows an exemplary process for using a mobile scanner to request that AGVs transport appropriate items. The process 400 begins in step 401 wherein the user scans a machine readable code that designates a pick location or an item for transport using mobile scanner 210. The machine readable codes for pick/drop locations can be barcodes attached to a shelf, to the mail processing equipment, or the like. The mobile scanner 210 can scan a barcode on a particular pick/drop location 105/107, or can scan a code located near a particular pick/drop location 105/107 which corresponds to one of the pick/drop locations 105/107. The mobile scanner 210 can send the identifier of the scanned location to the system hub 110 to identify the pick location for an item.

In some embodiments an operator can scan the item, and the location of the mobile scanner 210 can be transmitted to the work management system 100 as the location of the item for pickup. In some embodiments, each pick/drop location 105/107, or each location in the facility can be associated with a set of coordinates. The work management system 100 can track and monitor the location of the mobile scanner 210 within the facility. When the item is scanned for pickup, the location of the mobile scanner 210 can be assigned as the pick location 105/107, or the system hub 110 can determine which pick/drop location 105/107 is closest to the location of the mobile scanner 210 at the time of scanning the item. This pick/drop location 105/107 can be set as the pick location of the item.

This process can also be accomplished when an item is scanned via the optical sensor system 230, as will be described elsewhere herein. This process can also be accomplished when an item is detected and computer readable code/identifier scanned via the ultrasonic sensor system 231 and camera system 233, as described elsewhere herein.

The process 400 proceeds to decision state 402, wherein it is determined if a corresponding drop location is known for the scanned or identified pick location. The system hub 110 can query the facility management database 112 to determine whether there is a default location associated with the identified pick location. If there is a known or predetermined drop location, the process 400 moves to process block 403 where the AGV is requested as described above with regard to FIG. 3. If the drop location is not known, the work management system 100 sends a message back to the mobile device 210 and the process 400 proceeds to step 404, wherein the drop off destination is input. In some embodiments, the user uses the mobile scanner 210 to scan a machine readable code associated with a drop location as the destination. The drop locations which are common for a particular pick location can have computer readable codes located near the pick location which an operator can scan as destinations for the item. In some embodiments, in decision state 402, the work management system 100 can determine whether the destination is known based on the scan of the item. For example, an item for transport may have a destination encoded within or associated with the item identifier, or item code on the item. In this case, the work management system 100 determines the destination based on the scanned identifier on the item, and the AGV is requested as described elsewhere herein.

In some embodiments, the specific pick/drop location 107 to which the item may not be stored or associated with the item code. For example, an item may be intended for delivery to another facility in a different geographic region. The item code may include or be associated with the name of the facility or the city to which the item must be delivered, but does not indicate which pick/drop location 107 to which the item must be moved by the AGV. The system hub 110 can determine based on the facility management plan, where items intended for delivery to the different facility or city are being placed, such as, for example, loading dock 2. The system hub 110 can identify loading dock 2 as the required destination, and can select a pick/drop location 107 at loading dock which is not occupied, or which is available to receive the item.

The process 400 moves to step 400, wherein the AGV is requested. The work management system 100 can then request an AGV for the operation or route as described elsewhere herein.

Figure 5:
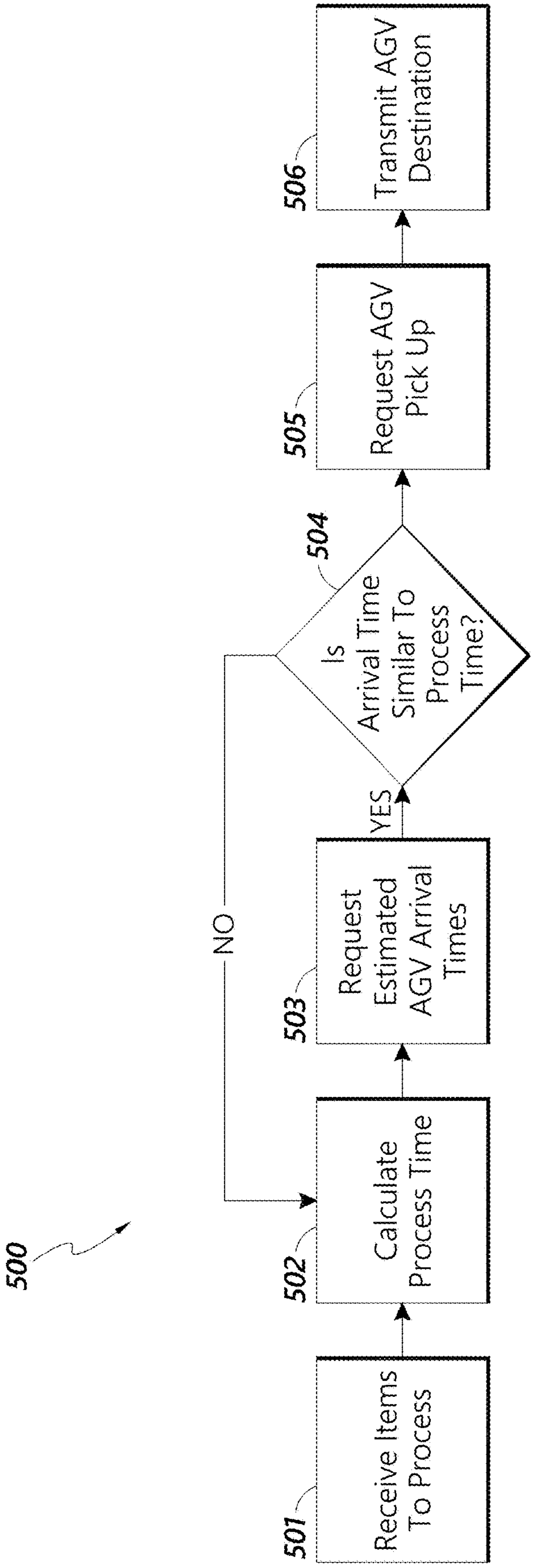
FIG. 5 shows an exemplary process for allowing mail processing machines or other types of warehouse equipment to request AGVs to transport processed items.

FIG. 5 shows an exemplary process for allowing mail processing equipment or other types of warehouse equipment to request AGVs to transport processed items. A process 500 begins in step 501, wherein the mail processing equipment 220 receives items to process and begins processing the items. The processing of items can include sorting, facing, cancelling, casing, feeding, singulating, shingulating, and the like.

The process 500 moves to step 502, wherein the mail processing equipment 220 calculates an estimated process time for the mail processing equipment 220 to finish a batch, a load, and the like, and an end runtime. For example the mail processing equipment 220 can determine that it will take 5, 10, or 15 minutes to finish processing a batch or load of items, or that an item will be ready for output and transportation at a certain time in the future. This estimate can be performed based on historical runtime data, can always be a set time, can be based on processing a known number of items, and on other factors. In some embodiments, an operator can set the mail processing equipment to finish at a certain time.

The process 500 proceeds to process block 503, wherein an AGV is requested to arrive at the estimated time. The work management system 100 can determine which AGV is available and/or preferred to arrive at the estimated time or closest to the estimated times. This determination can be made as described elsewhere herein, and can be based on workload estimates for the facility. In some embodiments, the process will not proceed to process block 503 until the estimated time to process the items is within a certain range, such as between 5 and 15 minutes. For example, when an estimated completion time is 20 minutes, 30 minutes, an hour, or more away, requesting an AGV to arrive that far in the future may not maximize efficiency, and the prediction of AGV availability may be too attenuated, and assigning an AGV a mission or operation too far in the future could cause inefficiency or problems in the facility.

In some embodiments, the mail processing equipment can request a drop off of the next batch of items for processing on the mail processing equipment to occur at a specific time. In some embodiments, this estimate can be made by the work management system 100 or can be requested by the mail processing equipment 220.

The process 500 proceeds to decision state 504, wherein the mail processing equipment 220 compares its estimated time to complete processing the items or to have items delivered with the estimate times for various AGVs to arrive at the pick/drop locations where the mail processing equipment will deposit the items. In some embodiments, the two times will be similar if they are within a certain range of each other, such as when they are within 1, 5, or 10 minutes of each other. In some embodiments, the mail processing equipment 220 can determine that the two times are similar if all of the AGV estimated arrival times are greater than the estimate processing time. If the mail processing equipment 220 determines that the two times are not similar, the process returns to process block 502. Otherwise the process 500 proceeds to step 505.

In step 505, the mail processing equipment 220 requests an AGV to pick up the items at the pick/drop locations where the items that the mail processing equipment is processing either has picked up or will deposit the items from the work management system 100.

The process 500 moves to step 506 wherein the mail processing equipment 220 transmits the destination pick/drop locations for the AGV to the work management system 100. In some embodiments, the determination of the pick/drop locations can be done by the work management system 100. In some embodiments, the mail processing equipment 220 or the work management system 100 determines the destinations based on the delivery addresses of the items processed on the mail processing equipment 220. For example, the mail processing equipment 220 may sort all of the items destined for a particular zip code together and then know that items for that zip code always go to a particular destination pick/drop locations.

Figure 6A:
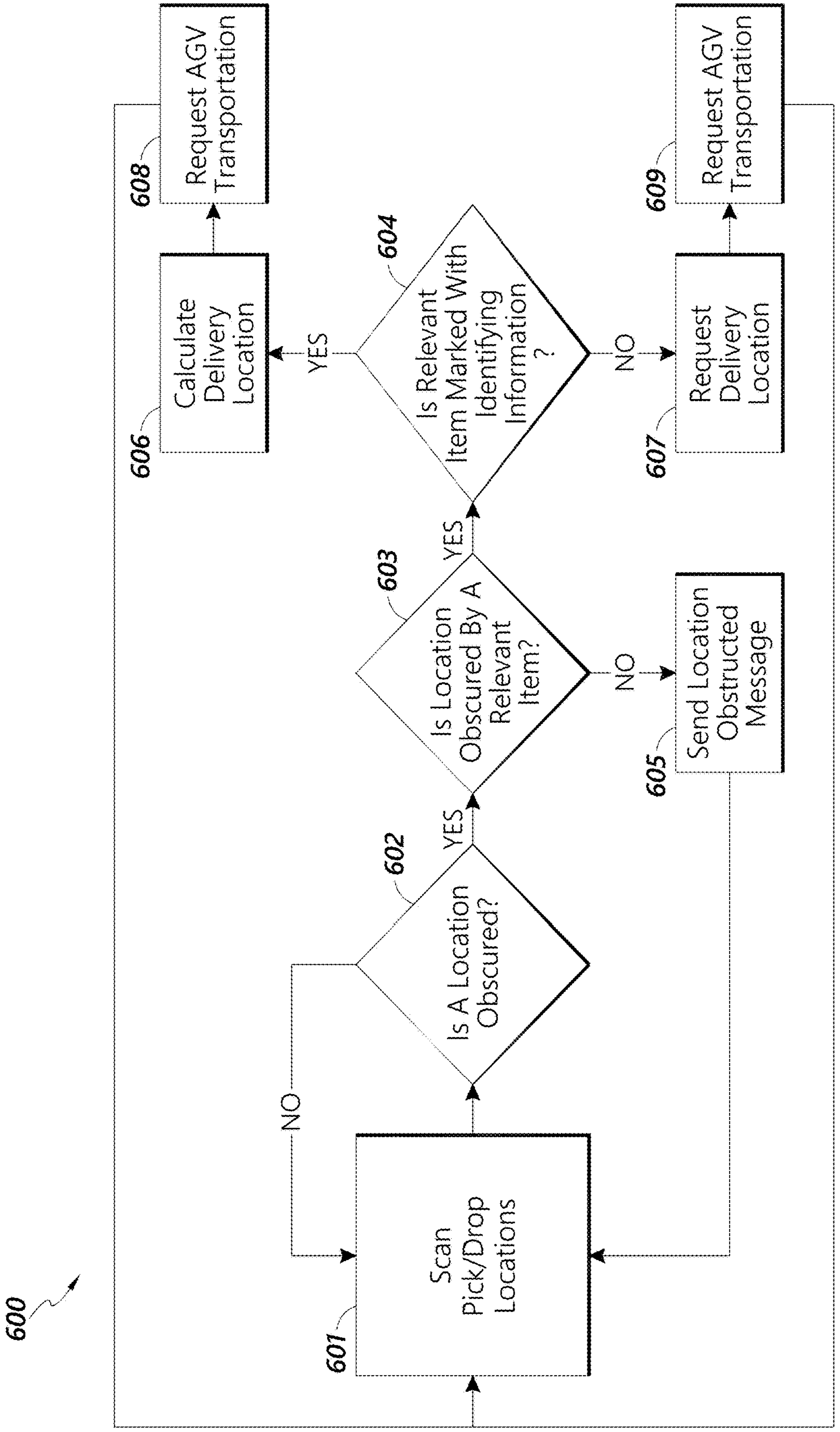
FIG. 6A shows an exemplary process for using a camera system to request that AGVs transport appropriate items.

FIG. 6A shows an exemplary process for using a camera system to request AGVs transport to appropriate items. A process 600 begins at process block 601, wherein the system hub 110 communicates with the optical sensor system 230 to scan the various pick/drop locations 105/107.

The process 600 proceeds to decision state 602 wherein it is determined whether an item is detected in a pick/drop location 105/107, or in another location of the facility. The system hub 110 uses the scan data from the optical sensor system 230 to determine if any of the various pick/drop locations are obscured by an object, as described elsewhere herein. If an item is detected, the process 600 proceeds to decision state 603. Otherwise the process returns to step 601.

In decision state 603, the system hub 110 determines whether the identified location contains an item that needs to be transported. In some embodiments, the optical sensor system 230 can read identifiers, such as computer readable codes on items. The work management system 100 can then determine if the item needs to be transported by an AGV using the identified computer readable code. If the pick/drop location 105/107 has a relevant item, the process 600 proceeds to decision state 604. Otherwise, it proceeds to step 605.

In process block 605, system hub 110 sends out a "location obstructed" message to notify workers at the facility that a pick/drop location 105/107 is obstructed. In some embodiments, this message can contain the positions of the obstructed pick/drop locations, for the item to be moved out of the way, or to be processed. In some embodiments, the message is sent to a mobile scanner 210.

In decision block 604, the work management system 100 determines whether the item is marked with identifying information to determine where the item should be moved. In some embodiments, this identifying information can be contained in a computer readable code located on the item and read by the optical sensor system 230. If the item can be identified, the process 600 proceeds to step 606 and a delivery location is calculated and the appropriate drop location is determined. In some embodiments, the delivery location can be calculated by the system hub 110 in conjunction with the surface visibility system 240. Then the process proceeds to step 608, where the system requests an AGV to transport the relevant item, as described herein.

If the relevant item is not marked with identifying material, the process proceeds to block 607, where the system requests a delivery location. In some embodiments, the system hub 110 can send a message to mobile scanner 210 to ask a delivery worker to supply a delivery location. Once a destination for the item has been determined, the appropriate drop location is determined. Then the process proceeds 600 to step 609, where the system requests an AGV to transport the relevant item.

Figure 6B:
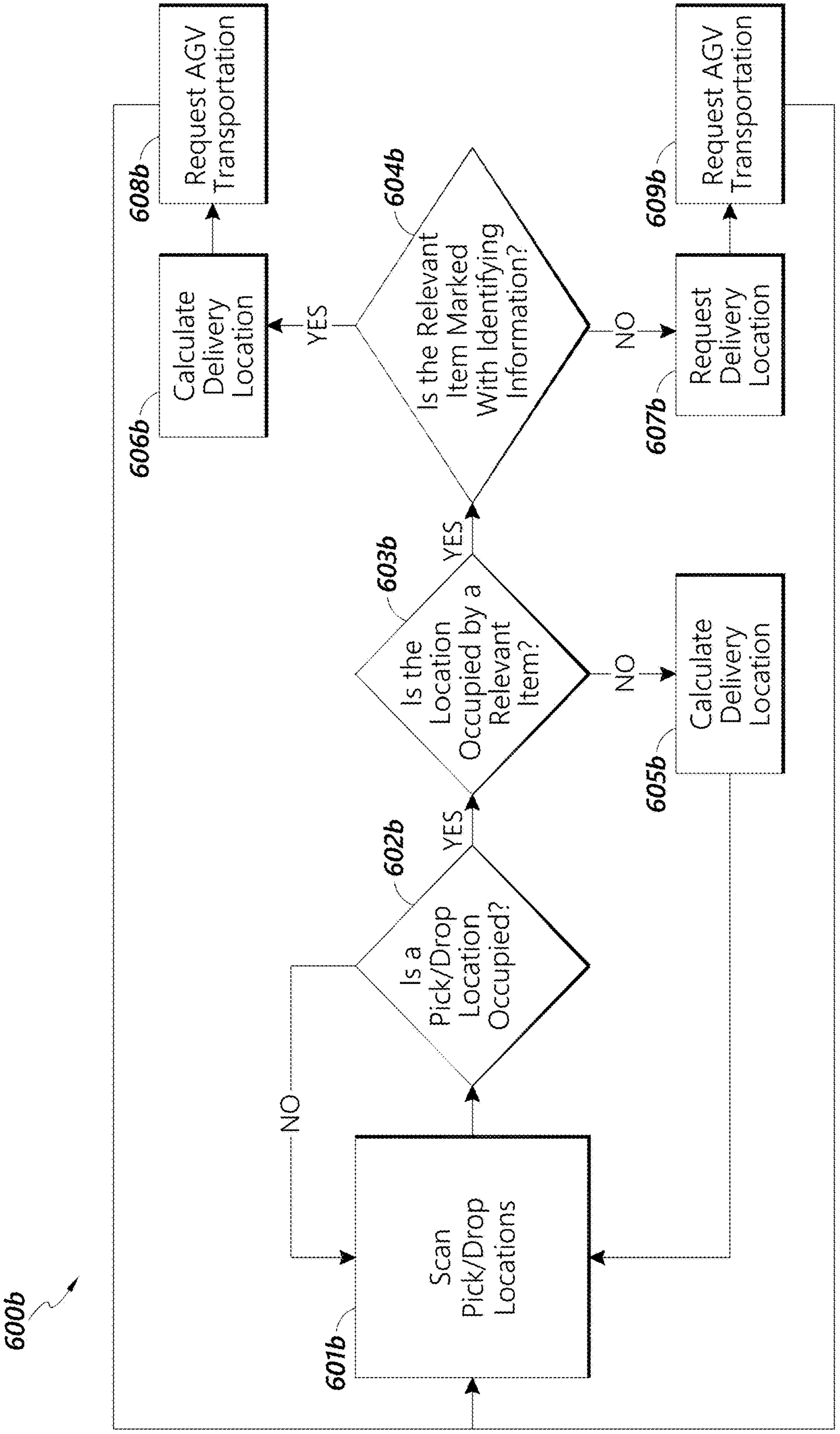
FIG. 6B shows an exemplary process for using an ultrasonic sensor system and a camera system to request that AGVs transport appropriate items.

FIG. 6B shows an exemplary process for using the ultrasonic sensor system 231 and camera system 233 to request AGVs to transport appropriate items. A process 600*b* begins at process block 601*b*, wherein the system hub 110 communicates with the ultrasonic sensor system 231 to scan the various pick/drop locations 105/107 or another location of the facility. The scanning of the pick/drop locations 105/107 by the ultrasonic sensor system 231 can be activated on a signal from the system hub 110, can be a passive, continuous scanning, intermittent scanning, and the like.

The process 600*b* proceeds to decision state 602*b* wherein it is determined whether an item is detected in a pick/drop location 105/107, or in another location of the facility. As explained elsewhere herein, the ultrasonic sensor system 231 has one or more ultrasonic transducers that can be used to determine whether a pick/drop location 105/107 is occupied or unoccupied. If the pick/drop location 105/107 is occupied, the process 600*b* proceeds to decision state 603*b*. Otherwise the process returns to block 601*b*.

In decision state 603*b*, the system hub 110 determines whether the pick/drop location 105/107 is occupied by an item that needs to be transported (e.g., relevant item). In some embodiments, the camera system 233 can reads identifiers, such as computer readable codes, on items. The work management system 100 can then determine, using the identified computer readable code, if the item needs to be moved or transported by an AGV. If the pick/drop location 105/107 is occupied by a relevant item, the process 600*b* proceeds to decision state 604*b*. Otherwise, the process 600*b* proceeds to block 605*b*.

In process block 605*b*, the system hub 110 sends out a "location obstructed" or an "item present" message, or other similar message or notification, to notify personnel at the facility that a pick/drop location 105/107 has an item to be processed, moved, etc. In some embodiments, the message can contain the positions of the pick/drop locations 105/107 for the item to be moved or to be processed. In some embodiments, the message is sent to a mobile scanner 210.

In decision state 604*b*, the work management system 100 determines whether the item is marked with identifying information to determine where the item should be moved. In some embodiments, this identifying information can be contained in a computer readable code located on the item and read by the camera system 233. If the item can be identified, the process proceeds to block 606*b* and a delivery location is determined and the appropriate drop location 107 is determined. In some embodiments, the drop location 107 can be determined by the system hub 110 in conjunction with the surface visibility system 240. The process 600*b* proceeds to step 608*b*, where the system 100 request an AGV to transport the relevant item, as described herein.

If the relevant item is not marked with identifying material, the process 600*b* proceeds to block 607, where the system requests a delivery location. In some embodiments, the system hub 110 can send a message to mobile scanner 210 to ask a delivery worker to supply a delivery location. Once a destination for the item has been determined, the appropriate drop location is determined. Then the process 600*b* proceeds to block 609*b*, where the system requests an AGV to transport the relevant item.

Figure 7:
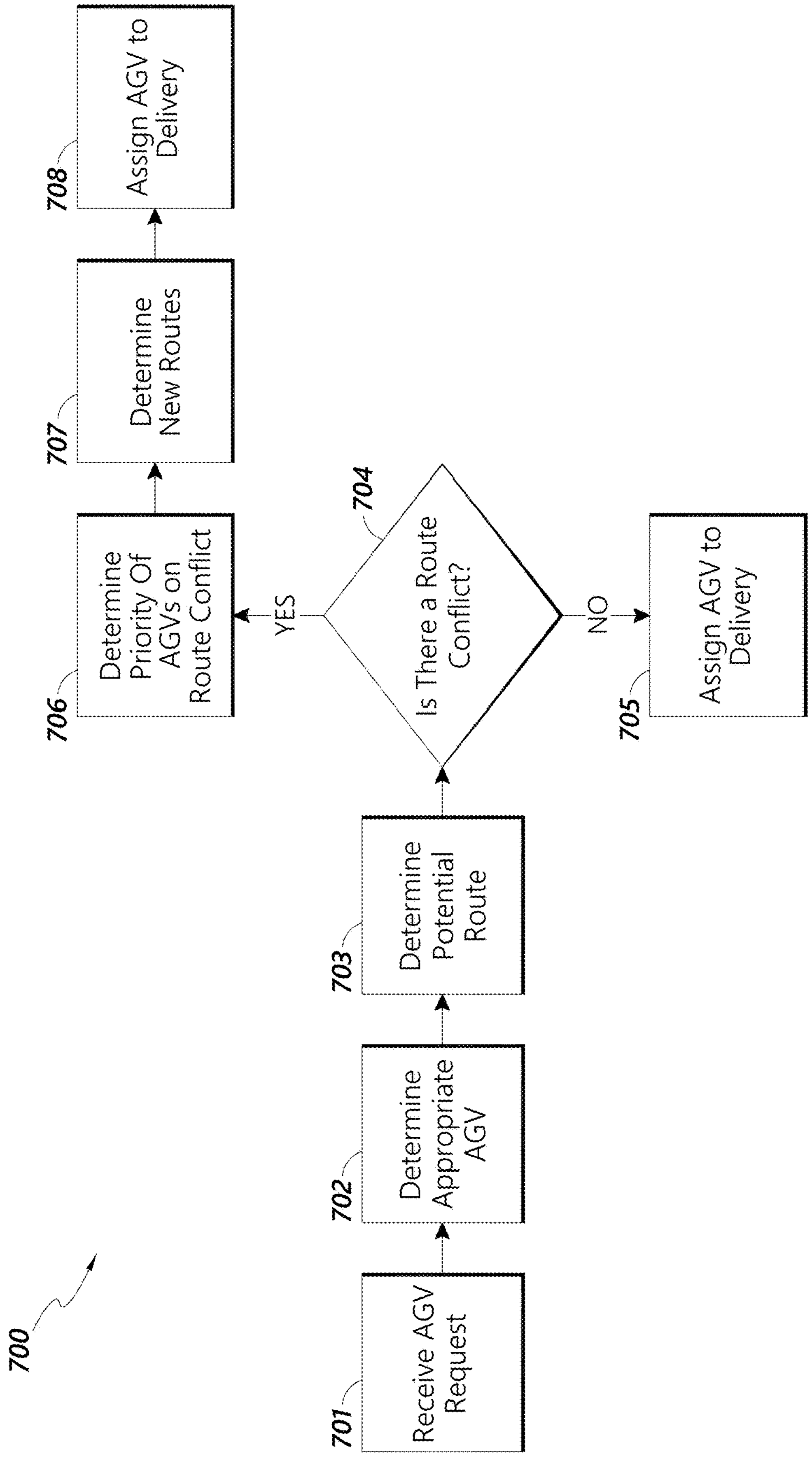
FIG. 7 shows an exemplary process for handling potential collisions in AGV routes after receiving a request for an AGV to transport items.

FIG. 7 shows an exemplary process for assigning an AGV to a task and handling route conflicts. The process 700 starts in process block 701, wherein the work management system 100 receives a request for an AGV as described elsewhere herein. The process 700 then proceeds to step 702.

In step 702, the system determines the appropriate AGV to assign to a task. In some embodiments, the system can determine various factors on which AGV to assign. For example, the system could consider which AGV is closest to the pick location, which AGV model types are faster or slower moving, and which AGV model types can handle certain types of packages. For example, forklift type AGVs may only be appropriate for some types of packages, while "tugger" type AGVs, which can only tow certain types of dollies, may be appropriate for other types of packages. The process 700 then proceeds to step 704.

In step 703, the system determines a potential route for the AGV assigned to the request. In some embodiments, the routes can be determined based on preprogrammed route legs that can be combined into single routes. In some embodiments, the route can be determined based on the shortest travel distance between the pick/drop locations. In some embodiments, the routes can contain preprogrammed pauses where the AGV is motionless to prevent collisions with other AGVs. The process then proceeds to decision block 704.

In decision state 704, the system determines whether the route determined in step 703 conflicts with any routes assigned to any other AGV. If not, the process 700 proceeds to step 705, where the AGV is assigned to delivery.

If there is a conflict, the process 700 proceeds to step 706. In step 706, the system determines which of the various AGVs route conflicts has priority for continuing on a route. In some embodiments, the system makes this determination based on which AGV is farthest along on its assigned route already and which package needs to be delivered more urgently. The process then proceeds to step 707.

In step 707, new routes are determined for the lower priority AGV to avoid route conflicts. Then the AGV is assigned to the delivery in step 708.

Figure 8:
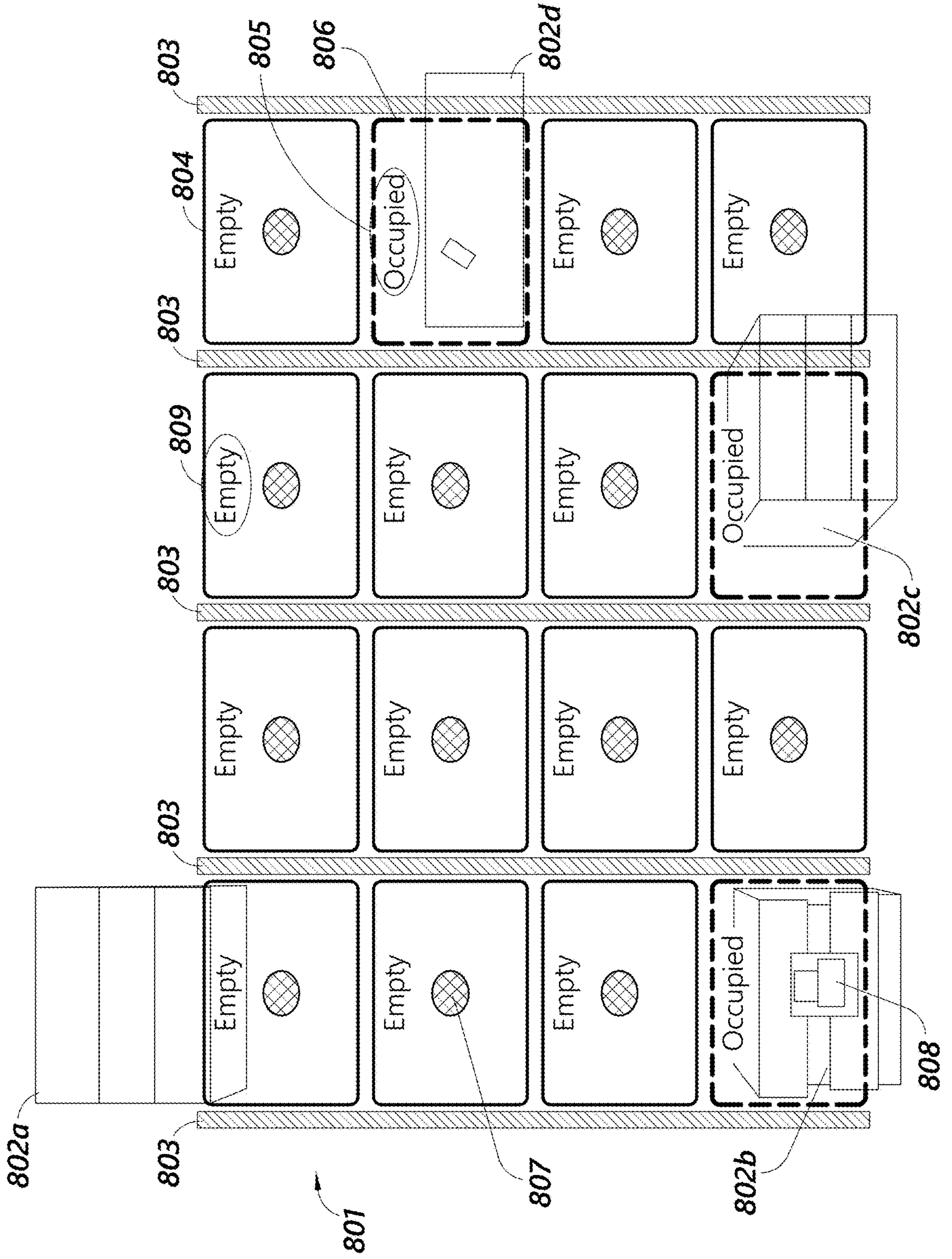
FIG. 8 shows an exemplary view of a camera used in an optical sensor system in one embodiment of the present invention.

FIG. 8 shows an overhead view of an area of a facility monitored by the optical sensor system 230. FIG. 8 depicts a portion of a dock or other facility area with computer generated overlays to illustrate the system. The view of the dock shown is an example of the field of view of a camera or sensor in the optical sensor system 230. The dock shown is arranged into a grid 801 of pick/drop locations. The grid is divided into lanes by lines 803. The lanes can be actually applied to the floor of the dock, such as with high-contrast tape paint, or other material which is recognizable to a camera of the optical sensor system 230. The lines 803 can provide an indication to operators where in the dock or facility the grid 801 is located which is monitored by the optical sensor system 230.

Each square or location within the grid 801 can be identified by a target 807. The target can be a high contrast marking recognizable to the optical sensor system 230, or can be a code or other indicator which the optical sensor system 230 can identify and recognize. The target 807 can be used to determine whether an item for transport is located within the square of the grid. The optical sensor system 230 can determine or identify whether a target 807 is partially or fully obscured. If a target 807 is partially or fully obscured, the optical sensor system 230 can determine that there is an item in the grid square which is to be moved to a different location in the facility.

The optical sensor system 230 can identify or store a status of each square within the grid 801. For example, the status of a square can be empty or occupied. For case of illustration, the grid squares are shown with a status box 804 around each target 807, and each square contains a status identifier "Empty" 809 or "Occupied" 805, as applicable. The status box 804 can be solid line where the square's status is empty, or a status box 806 can be a dashed line when the square is determined to be occupied. In some embodiments, the status boxes 804, 806 can be different colors depending on the status of the square, for example, the empty status box 804 can be shown in a green line, and the occupied status box 806 can be shown in a red line. These overlays can be generated in a computer display so as to be visible on a computer, tablet, mobile computing device, and the like, such as is used by facility personnel, and particularly supervisory personnel. The status boxes 804, 806 and the status identifiers 805, 809 can give a quick view of which squares of the grid 801 contain items. In response to these, AGVs can be summoned to pick up the items in the occupied squares.

In some embodiments, the squares of the grid can be further identified by grid reference numbers, which correspond to physical locations within the plant. An operator or the optical sensor system 230 can identify the occupied square of the grid 801, and can summon an AGV as described herein, by inputting the grid reference number of the occupied square.

The optical sensor system 230 can determine whether an item is present in a square of the grid 801 by determining how much the target 307 of the grid is obscured. For example, FIG. 8 depicts 4 items, 802*a-d* which are staged or located at the dock. Item 802*a* is disposed partially within one of the squares of the grid 801, but the item does not cover any portion of the target 807 within that grid. So, the optical scanner system 230 can identify that square as "Empty". The item 802*b* is located fully within one of the squares of the grid 801, and the corresponding target 807 is entirely obscured. The optical scanner system 230 can identify this square as "Occupied" because the entire target 307 is obscured.

The item 802*c* is not located fully within a single square of the grid 801, but the entire target 307 of that square is obscured, therefore, the optical scanner system 230 can identify this square of the grid as "Occupied." The item 802*d* can be treated similar to the item 802*c*.

In some embodiments, the optical sensor system 230 can determine if one of the squares in the grid 801 is occupied if the target 307 is 50% or more obscured, or some other threshold percentage. Setting a threshold can avoid false positive identifications when a small debris or other similar object obscures a portion of the target. In some embodiments, the optical sensor system 230 may set a threshold at 90%, 95%, or 100% obscured in order to identify a square as occupied.

In some embodiments, the optical sensor system 230 does not use targets 307, and targets 307 may not be present in the grid. In this case, the optical sensor system 230 can set a boundary around each square of the grid, either a virtual boundary or an actual physical boundary, and can set a baseline for an empty square, for example, using a reference image taken when the squares are verified empty. The optical sensor system 230 can determine that an item occupies one of the squares based on the change in the image, or the change of the field of view when an item is placed in one of the squares. The optical sensor system 230 can use a threshold percentage to determine whether the change in the image of the square is due to an item, and thus, the square is "occupied." For example, if the optical sensor system determines that greater than 50% of the area (or any other desired percentage) of the square bounded by the virtual or physical boundary is obscured or changed from the reference image, the optical sensor system 230 can determine that the grid is "occupied," update the grid status, and display an occupied indicator on a display screen. It will be understood that 50% is exemplary only, and that other threshold levels can be used.

When the optical sensor system 230 determines that an item is present within a square of the grid 801, the optical sensor system 230 can scan the square to find a label or identifier 808 on the item 802*b*, for example. In some embodiments, the identifier 808 can encode a destination for the item, can be associated with a destination, status, or other item information in the work management system 100. As described elsewhere herein, when the optical sensor system 230 identifies the identifier 808 on the item, the optical sensor system 230 can request an AGV for picking up the item 802*b*.

In some embodiments, the optical sensor system 230 can continuously look for identifiers within the grid 801. For example, the grid 801 may not have targets 307, and the optical sensor system 230 may not be looking to identify items occupying the squares. When the optical sensor system 230 sees/recognizes an identifier 808, within the grid 801, the optical sensor system 230 can determine that the square within which the identifier 808 is seen is occupied.

It may not always be the case, however, where items are labelled on a surface visible to the optical sensor system 230. Thus, it is explicitly contemplated that combinations of the embodiments of the optical sensor system 230 described herein can be used. For example, an embodiment of the optical sensor system 230 can identify items using targets 807, detection of items within the boundaries of the squares, and can be continuously looking for identifiers 808. In some embodiments, these different techniques can work as back-up or confirmation of the presence or absence of an item within the grid 801.

Figure 9:
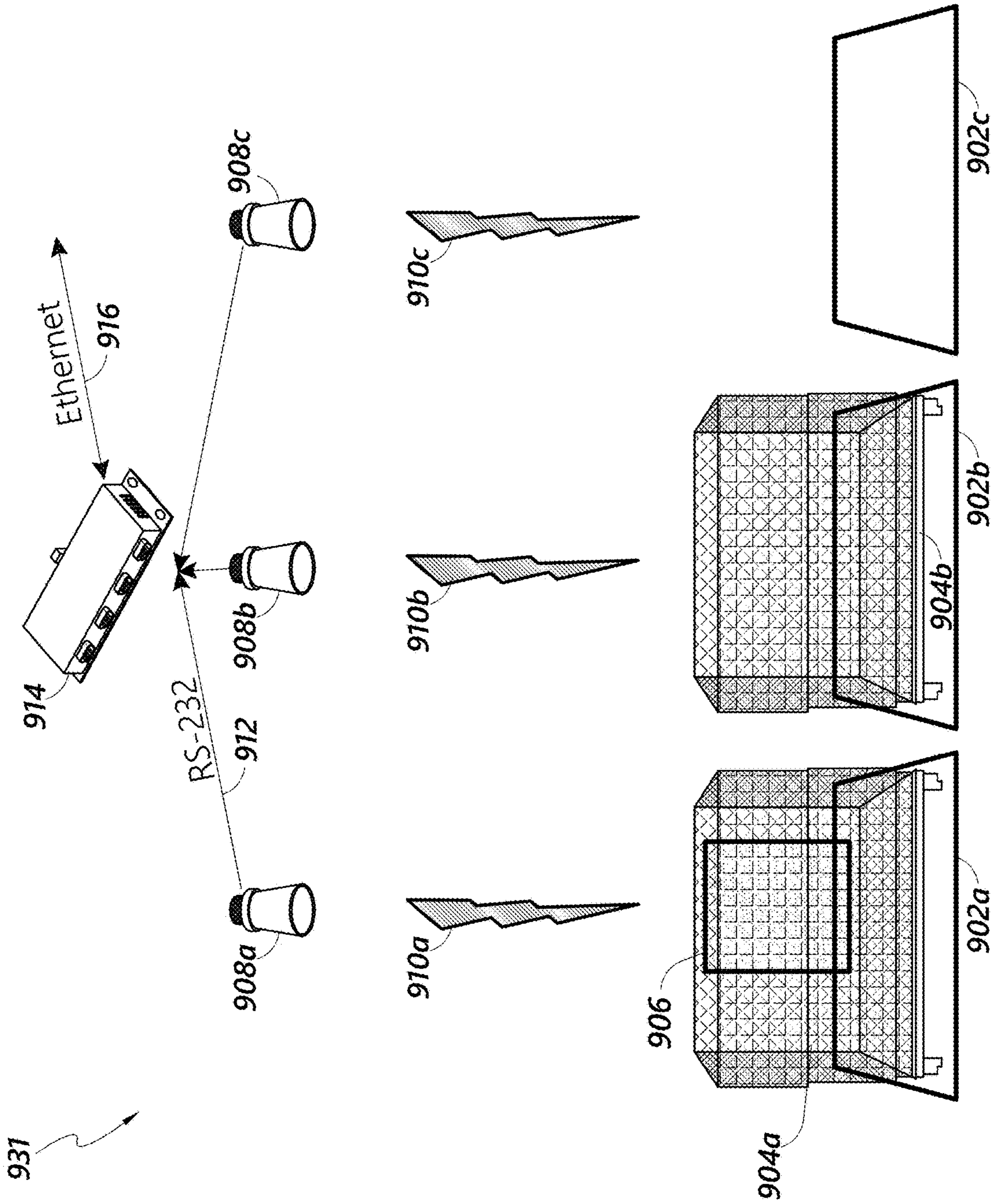
FIG. 9 shows an exemplary ultrasonic sensor system for detecting items.

FIG. 9 shows an exemplary ultrasonic sensor system 931. The ultrasonic sensor system 931, can be similar to those described elsewhere herein. The ultrasonic sensor system 931 can have one or more ultrasonic transducers 908*a*-908*c* and other features not illustrated.

The ultrasonic transducers 908*a*-908*c* can be connected to the work management system 100. In some embodiments, ultrasonic transducers 908*a*-908*c* can be connected via serial interfaces of the ultrasonic transducers 908*a*-908*c* to cables 912 (e.g., a RS-232 compliant connection) to an Ethernet gateway 914 that is wired via Ethernet 916 to the communication module 111. The ultrasonic sensor system 931 can relay data and power via the Ethernet 916. In some embodiments, data is relayed wirelessly.

The one or more ultrasonic transducers 908*a*-908*c* can each be positioned above a pick/drop location 902*a*-902*c*, which can include being positioned at a known height, for example, at a height of 9-12 feet relative to the floor of the facility, but other operable heights are possible. In some embodiments, the pick/drop locations 902*a*-902*c* can be indicated with tape, paint, or other material applied to the floor of the facility such that personnel and/or AGVs know where to place items. The pick/drop locations 902*a*-902*c* can be similar to pick/drop locations described elsewhere herein.

Each of the ultrasonic transducers 908*a*-908*c* can detect the presence or absence of an item at the respective pick/drop location 902*a*-902*c* over which the ultrasonic transducer is positioned. As explained elsewhere herein, the ultrasonic transducers 908*a*-908*c* can emit a sound pulse 910*a*-910*c* (e.g., sound wave, signal) directed at the respective pick/drop location 902*a*-902*c* and receive an echo to determine occupancy and/or the status of an item positioned at the pick/drop location 902*a*-902*c*. The sound pulse 910*a*-910*c* can be configured to be restricted or substantially restricted to the respective pick/drop location 902*a*-902*c* such that an item in a neighboring pick/drop location is not erroneously detected. In some embodiments, ultrasonic transducers 908*a*-908*c* are shaped to facilitate targeted and/or concentrated sound pulses 910*a*-910*c*. In some embodiments, the ultrasonic transducers 908*a*-908*c* continuously emit or periodically emit a sound pulse 910*a*-910*c* such that the ultrasonic sensor system 931 can continuously or periodically detect the status of a given pick/drop location 902*a*-902*c*.

As illustrated in FIG. 9, no item is positioned in pick/drop location 902*c*, and consequently, the ultrasonic sensor system 931 can determine that no item is occupying the pick/drop location 902*c* because the emitted sound pulse 910*c* traveled the maximum distance (e.g., to the floor) before being reflected back (e.g., longest time period between emission and receipt of an echo given the height of the ultrasonic transducers 908*c* relative to the floor). In contrast, an item 904*b* is positioned in pick/drop location 902*b*, and consequently, the ultrasonic sensor system 931 can determine that item 604*b* is occupying the pick/drop location 902*b* because the emitted sound pulse 910*b* traveled a shorter distance than the maximum distance before being reflected back (e.g., a shorter time period, compared to the time period indicative of no item present, between emission and receipt of an echo). In some embodiments, the occupancy of a pick/drop location 902*a*-902*c* is determined by referencing a distance or time period measured by the ultrasonic sensor system 931 when the pick/drop location 902*a*-902*c* is empty (e.g., a base line) and comparing it against the current distance and/or time period measurement.

In another example, an item 904*a* containing a parcel 906 is positioned in pick/drop location 902*b*, and consequently, the ultrasonic sensor system 931 can determine that the item 904*a* is present and, in some embodiments, contains a parcel 906 because the emitted sound pulse 910*a* traveled a shorter distance than the distance indicative of only an item being present before being reflected back and/or resulted in a different reflection profile than when only an item is present. In some embodiments, the ultrasonic sensor system 931 determines the presence of the item 904*a* and the parcel 906 due to a lag in echoes resulting from the sound pulse 910*a* reflecting off the surface of the item 904*a* and the surface of the parcel 906 (e.g., different distances measured, different time periods) caused by the varying heights. In some embodiments, the ultrasonic sensor system 931 can determined filled status, which can include levels such as empty, low, medium, full, etc., of the items by determining the distance between the ultrasonic transducer and the reflected surface(s) of the parcels in the items and, in some embodiments, comparing the distances against reference distances and their associated fill levels.

The ultrasonic sensor system 931 can advantageously use less data communication over camera-based systems because images need not be communicated. The ultrasonic sensor system 931 can advantageously not require installation on a high ceiling or overhead clearance in order to have a large field of view, which can enable the ultrasonic sensor system 931 to be applied in environments with varying ceiling heights and facilitate convenient maintenance (e.g., can be reached with a ladder). In some embodiments, the ultrasonic sensor system 931 is cost effective because decreased camera usage can be required.

Figure 10:
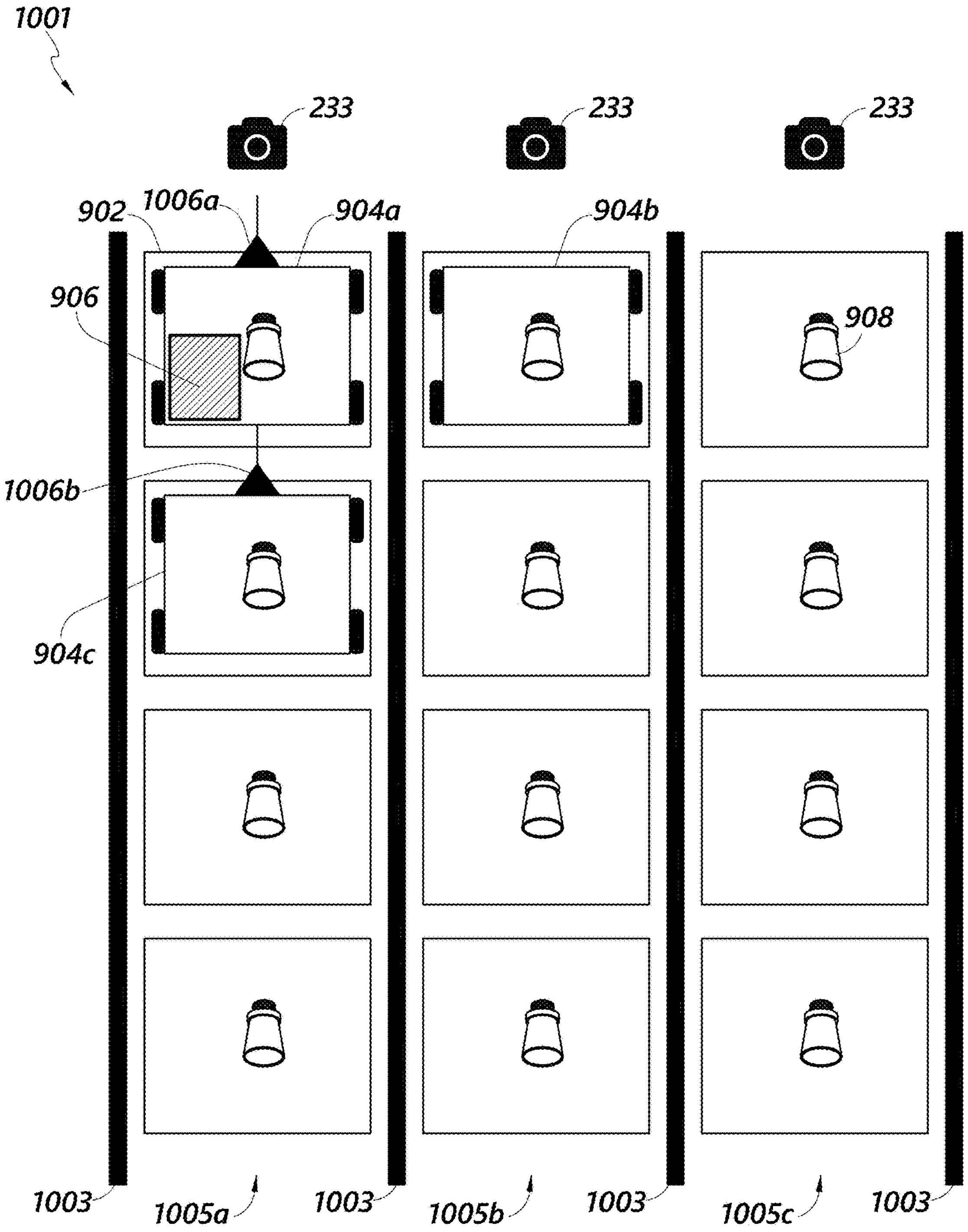
FIG. 10 shows an exemplary depiction of an ultrasonic sensor system and camera system monitoring locations in a facility.

FIG. 10 shows an overhead view of an area of a facility monitored by the ultrasonic sensor system 931, such as a dock. The dock shown is arranged into a grid 1001 of pick/drop locations 902. The grid is divided into lanes 1005*a*-1005*c* by lines 1003. The lines 1003 can be applied to the floor of the dock, such as with tape, paint, or other material. One or more pick/drop locations 902 can be positioned within each of the lanes 1005*a*-1005*c*. The pick/drop locations 902 can be indicated with tape, paint, or other material. The lines 803 and/or pick/drop locations 902 can indicate to an operator and/or AGV where to position items such that the items are monitored by the ultrasonic sensor system 931. In some embodiments, the lines 803 and/or pick/drop locations 902 are virtual.

The ultrasonic sensor system 931 can identify or store a status of each pick/drop location within the grid 1001. For example, the status of a pick/drop location 902 can be empty or occupied. Computer overlays, similar to those described in reference to FIG. 8, can be implemented, such as having a status box with a status identifier (e.g., "Empty" or "Occupied"), coloring, etc. These overlays can be generated in a computer display so as to be visible on a computer, tablet, mobile computing device, and the like, such as is used by facility personnel, and particularly supervisory personnel. The status boxes and the status identifiers can give a quick view of which pick/drop locations 902 contain items. In response to these, AGVs can be summoned to pick up the items in the occupied pick/drop locations 902. In some embodiments, the pick/drop locations 902 of the grid 1001 can be further identified by grid reference numbers, which correspond to physical locations within the plant. An operator or the ultrasonic sensor system 931 can identify the occupied pick/drop location 902, and can summon an AGV as described herein, by inputting the grid reference number of the occupied square.

The ultrasonic sensor system 931, as described elsewhere herein, can determine whether an item is present in each pick/drop location 902. An ultrasonic transducer 908 is dedicated to each pick/drop location 902 such that an occupied/unoccupied determination and/or status determination by an ultrasonic transducer 908 is associated with the pick/drop location 902 over which the ultrasonic transducer 908 is positioned. The ultrasonic sensor system 931, similarly to as described in reference to FIG. 8, can update a grid status and display an "occupied" indicator on a display screen. In some embodiments, the ultrasonic sensor system 931 can relay occupied/unoccupied determinations to the work management system 100 once made.

In some embodiments, items to be moved or transported can be coupled together by tow devices. For example, item 904*a* is coupled to item 904*b* via a towing device 1006*b* such that items 904*a* and 904*b* can be towed together, which can advantageously enable one AGV to move items more efficiently by taking fewer trips to move the items. The leading item 904*a* (e.g., the first item of a lane) can have a tow device 1006*a* coupled thereto to facilitate hitching to an AGV for towing. The tow devices can be coupled to the items by facility personnel or via other mechanisms. In some embodiments, the AGV can automatically hitch to the tow device 1006*a* to begin towing.

In some embodiments, the work management system 100 records data regarding the quantity of AGVs requested, the quantity of items transported, quantity of items transported per AGV towing, efficiency data, etc. over a period of time. In some embodiments, the work management system 100 waits to request or send an AGV to tow an item until multiple items are in a single lane. In some embodiments, the work management system 100 waits until a threshold quantity of pick/drop locations 902 of a given lane are occupied by items before requesting that an AGV hitch to the first item and tow the items in the given lane. For example, in some embodiments, the work management system 100 would not send an AGV to move item 904*b* because only one item is detected in lane 1005*b*, but the work management system 100 would send an AGV to item 1006*a* because two items are positioned in lane 1005*a* that can be towed by a single AGV, effectively using AGV resources. In some embodiments, the work management system 100 communicates to the AGV how many items will be towed such that AGV route, maneuvering, and/or other AGV functions can be adapted (e.g. the AGV may have a limited turn radius when towing multiple items).

In some embodiments, ultrasonic transducers 908 are only positioned above the first pick/drop location 902 of each lane 1005, such that the work management system 100 requests an AGV when the first pick/drop location is occupied. The requested AGV then tows the first item and any other items to which it is coupled. This can advantageously decrease the quantity of ultrasonic transducers used and decrease cost. When ultrasonic transducers 908 are only positioned above first pick/drop location 902 of each lane 1005, the ultrasonic transducer 908 can be configured or adapted to identify the number of items, which are moved out of the lane 1005 by the AGV. For example, as the AGV hooks up to the first item 904*a* and begins to move, the ultrasonic transducer 908*a* will detect first the presence of the first item 904*a*, and then will detect the absence of the first item 904*a* in the pick/drop location 902. As the AGV continues to move, the second item 904*c*, which is coupled to the first item 904*a*, will pass through the pick/drop location 902 and will be detected by the ultrasonic transducer 908 above the pick/drop location 902. The presence of the second item 904*a* can be sent to the work management system 100 which can determine that the AGV is moving two items. This process can be repeated for as many items as are being moved by the AGV. If only a single item is identified by the ultrasonic transducers 908, it is determined that the AGV is moving only a single item.

In some embodiments, a camera system 233 or one or more cameras of the camera system 233 is positioned at the front or has a view of the front of each lane 1005*a*-1005*c*. In some embodiments, a camera system 233 or one or more cameras of the camera system 233 is positioned at or has a view of each pick/drop location 902. As explained previously, the camera system 233 can include one or more cameras and/or other optical sensors to detect, which can include read, a computer readable code, information, and/or identifier on a label or placard attached to an item. The camera system 233 can include one or more cameras and/or other optical sensors to detect a towing device. In a preferred embodiment, the camera system 233 has at least one camera dedicated to detecting the computer readable code, information, and/or identifier on the label or placard attached to the item and at least one camera dedicated to detecting the towing device. Having a camera dedicated to detecting the computer readable code and another to detecting the tow device can enable the camera system 233 to use cameras that are preferred for their specific tasks.

For example, the camera used to detect a computer readable code, information, and/or identifier on the label or placard can be a monochrome camera and oriented to capture the area where a computer readable code, information, and/or identifier on the label or placard is expected to be positioned on an item. Having a camera dedicated to detecting the computer readable code, information, and/or identifier on the label or placard can advantageously enable the camera to capture the area that is expected to have the computer readable code, information, and/or identifier on the label or placard across a variety of items of different sizes and configurations. The camera for detecting the computer readable code, information, and/or identifier on the label or placard can be a 3.2 MP camera (1500×2000) but other cameras can be used. The camera used to detect the tow device can be a color camera and oriented to capture the area where a tow device is expected to be positioned on an item. The camera for detecting the tow device can be a 1.6 MP camera (1500×1000) but other cameras can be used. A two or more camera configuration (e.g., as explained above) can expand the field of view of the camera system 233 and/or improve the read rate of the computer readable code, information, and/or identifier on the label or placard compared to a single camera configuration. In some embodiments, the camera system 233 has a single camera that is used to detect the computer readable code, information, and/or identifier on the label or placard and detect the tow device. In some embodiments, the camera system 233 only has a camera for detecting the computer readable code, information, and/or identifier on the label or placard and no camera for detecting the tow device. In some embodiments, a camera system 233 can be directed at each pick/drop location.

In some embodiments, the camera system 233 or one or more cameras of the camera system is positioned at or has a view of the front of each lane and scans the first item of each lane such that the work management system 100 makes identify determinations for all the items in the lane based on the first item. In some embodiments, the camera system 233 or one or more cameras of the camera system is positioned at or has a view of the front of each lane 1005*a*-1005*c* and scans each item as its being towed out of the corresponding one of lanes 1005*a*-1005*c*. In some embodiments, a camera system 233 or one or more cameras of the camera system 233 is positioned at or has a view of each pick/drop location 902 such that every item of each lane is scanned. In some embodiments, a camera system 233 can include cameras strategically positioned relative to a lane such that the items being towed away from the lane are scanned. In some embodiments, all items, regardless of lane origin, are towed past one or more cameras of the camera system 233 (e.g., through a scan tunnel) to be scanned. The work management system 100 can direct an AGV to transport the scanned items according to a facility plan or routing plan for the scanned items.

Figure 11A:
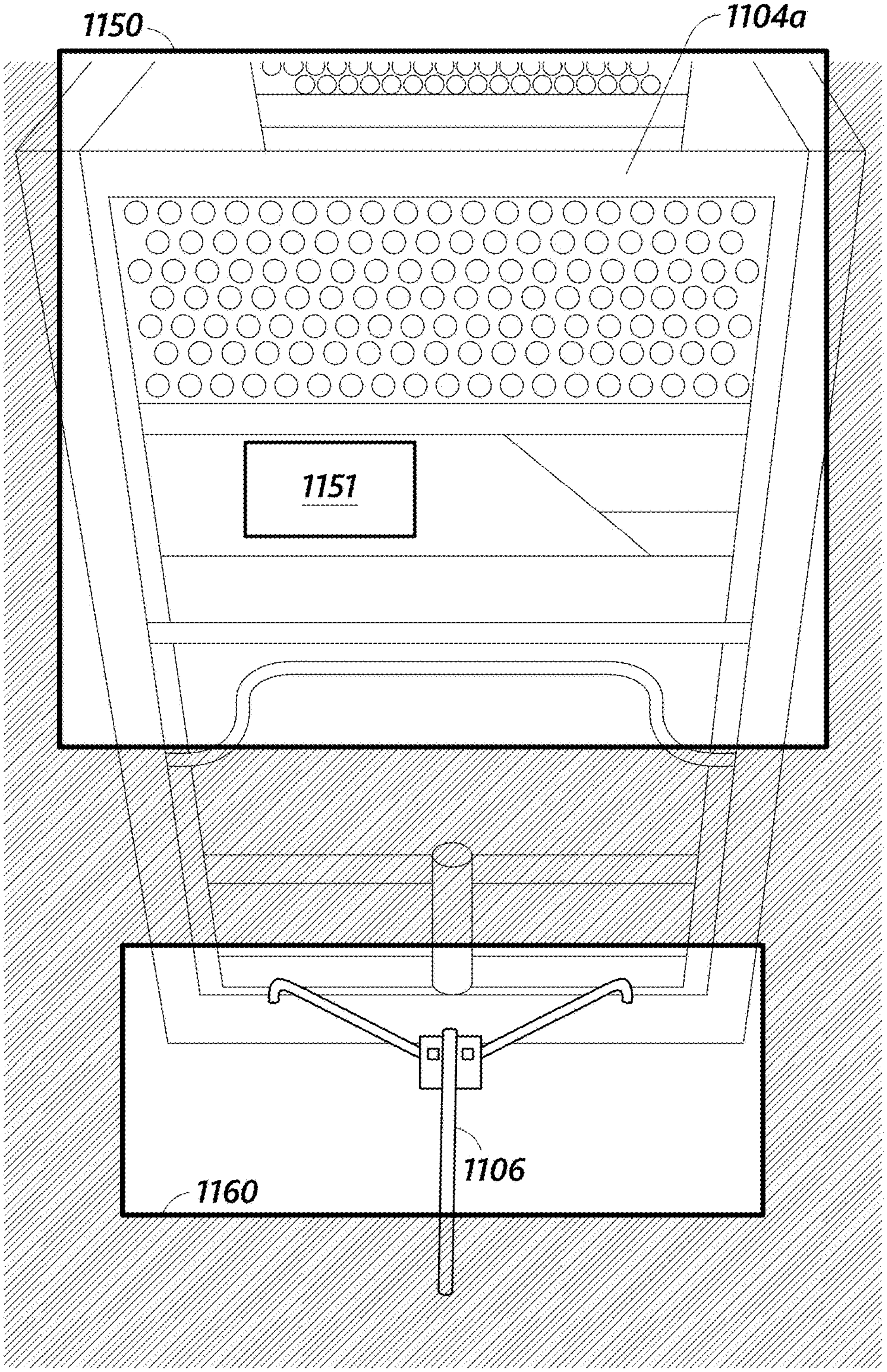
FIG. 11A shows exemplary camera views of the camera system for detecting an identifier on an item and a tow device.
Figure 11B:
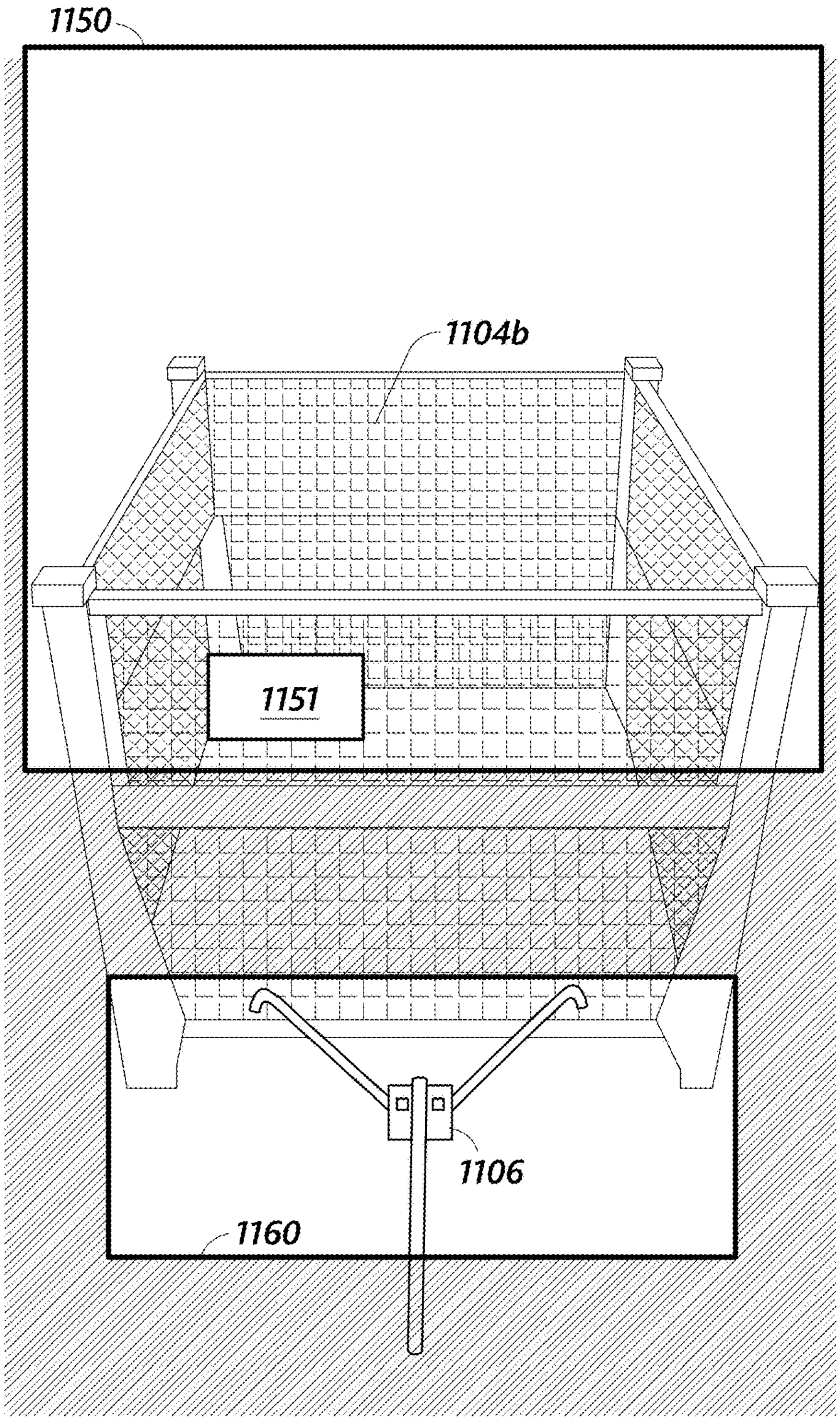
FIG. 11B shows exemplary camera views of the camera system for detecting an identifier on an item and a tow device.
Figure 11C:
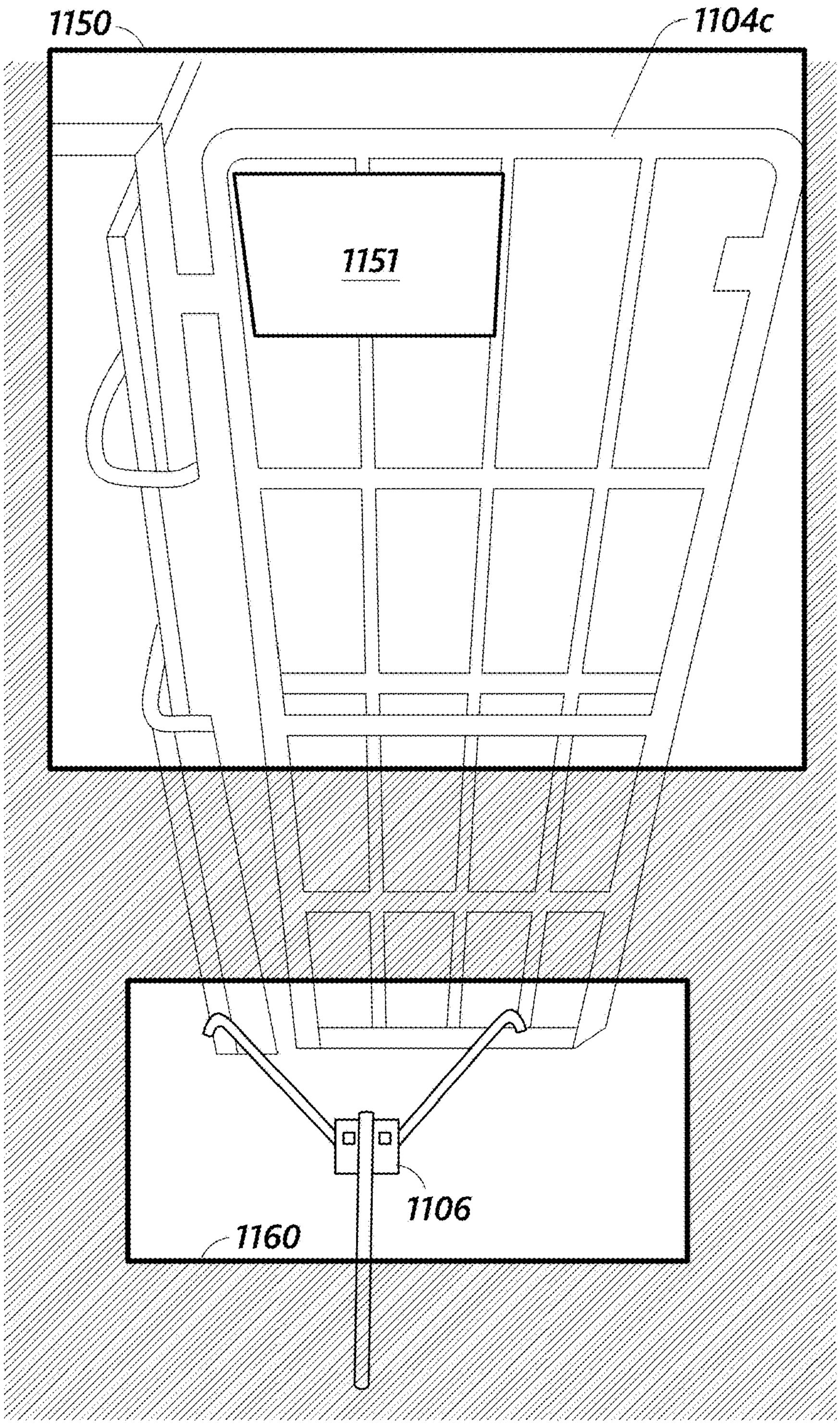
FIG. 11C shows exemplary camera views of the camera system for detecting an identifier on an item and a tow device.

FIGS. 11A-11C show exemplary camera views for a camera system 233. A high camera view 1150, which can be monochrome, shows the view of the camera dedicated to detecting the computer readable code, information, and/or identifier on a label or placard. The high camera view 1150 can capture the area where a label 1151 is expected to be located despite different mounting positions on differing items 1104*a*-1104*c*. For example, the label 1151 on item 1104*a* in FIG. 11A, the label 1151 on item 1104*b* in FIG. 11B, and the label 1151 on item 1104*c* in FIG. 11C all fall within the top view 1150. The high camera view 1150 can be advantageous for different items and label positions.

A low camera view 1160, which can be in color, shows the view of the camera dedicated to detecting the tow device 1106. The low camera view 1160 can capture the area where the tow device is expected to be located. The low camera view 1160 can be smaller than the high camera view 1150 because the size of the area where the tow device 1106 is expected to be locate can be smaller than the size of the area where the label 1151 is expected to be located.

Figure 12:
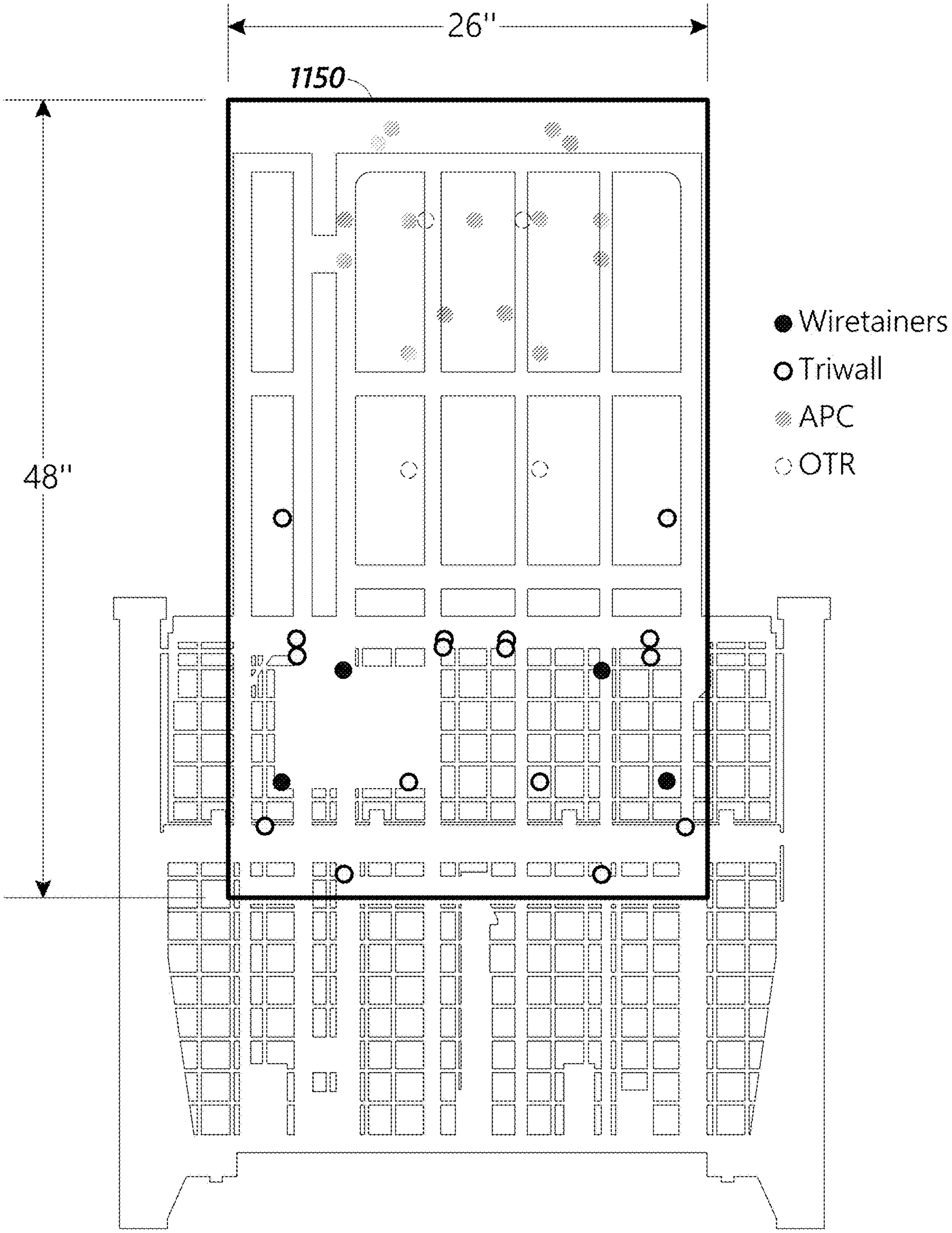
FIG. 12 shows exemplary identifier positions on an item.
Figure 13:
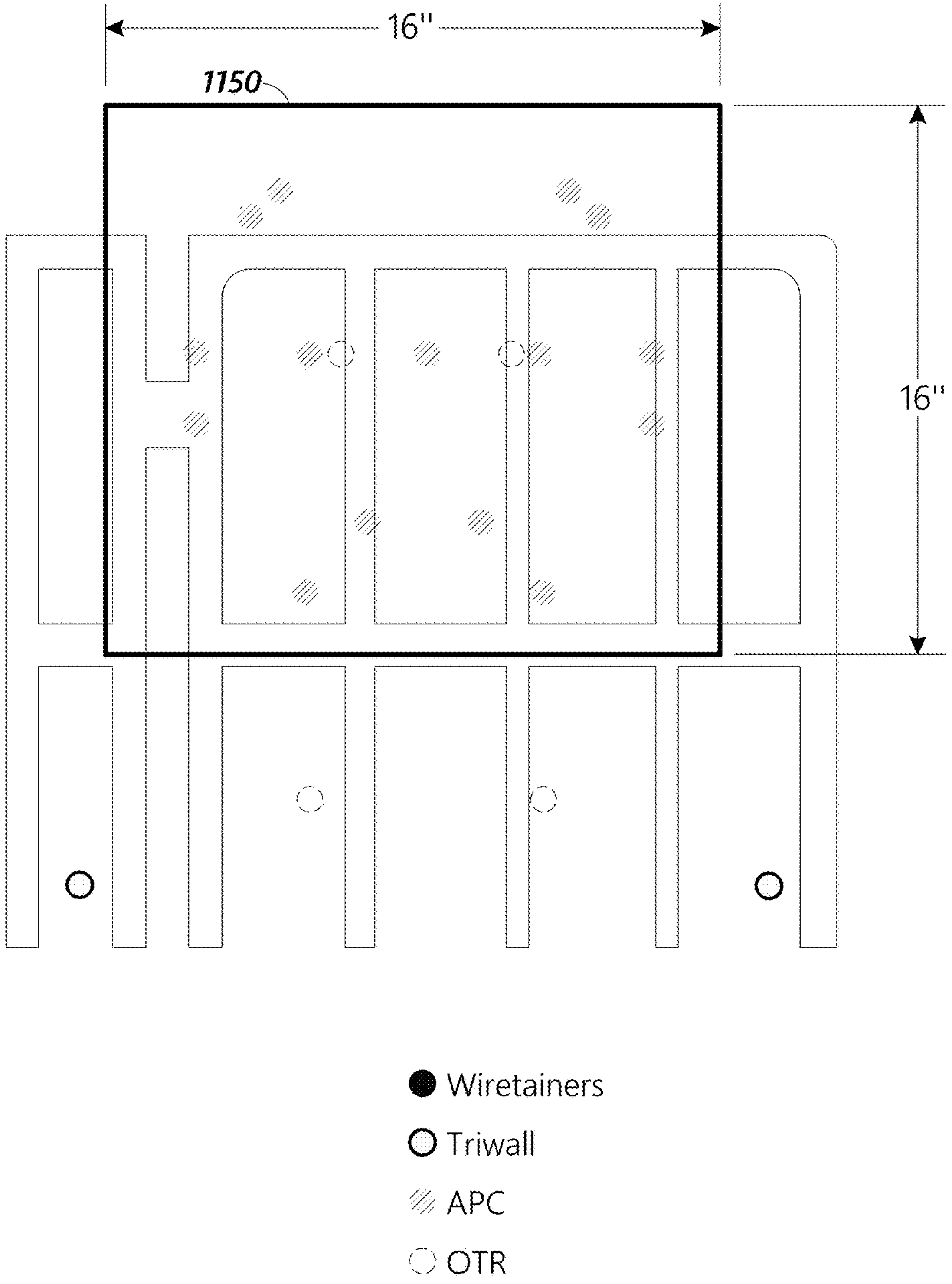
FIG. 13 shows exemplary identifier positions on an item.
Figure 14:
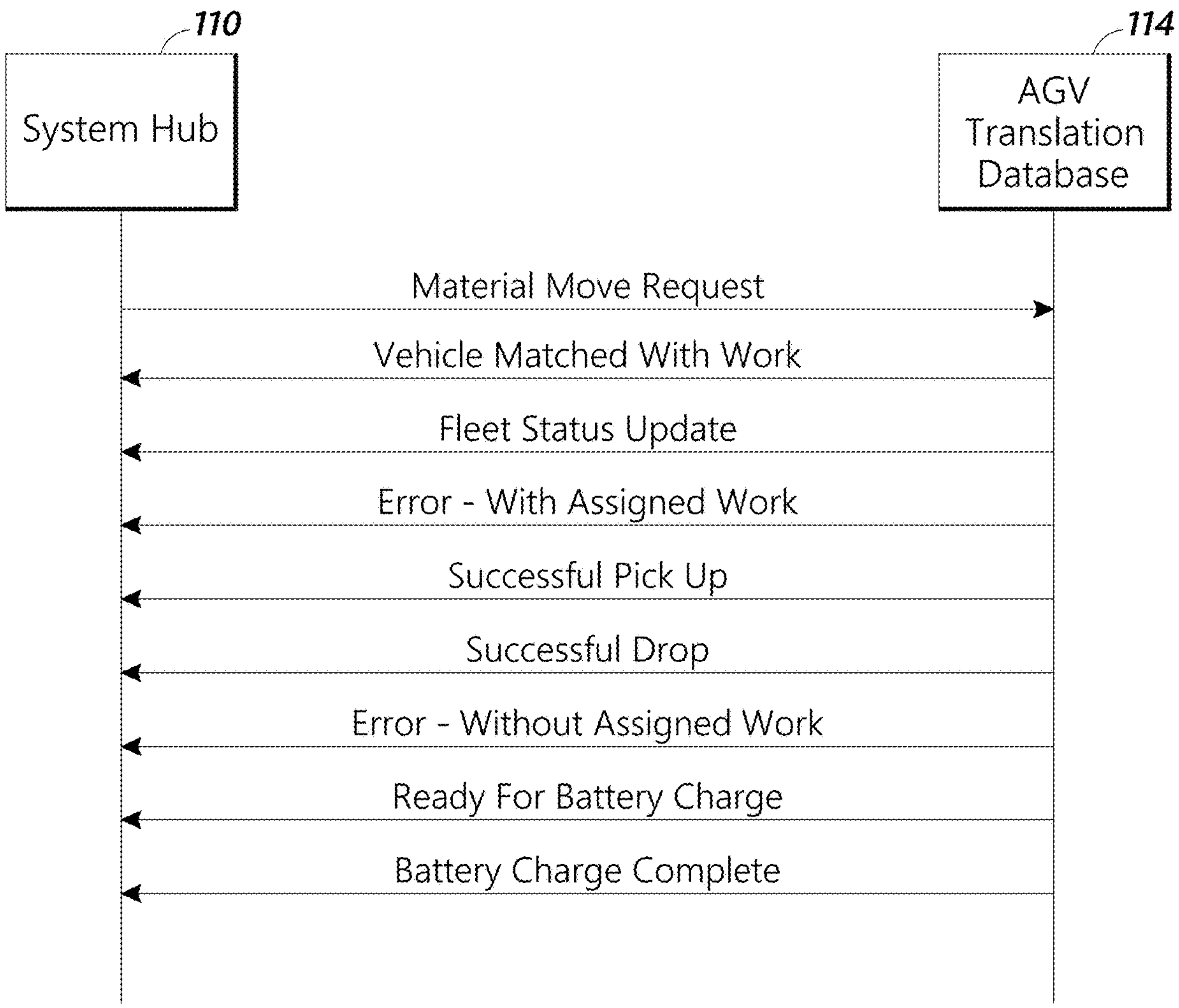
FIG. 14 shows an exemplary message-passing diagram for controlling AGVs in one embodiment of the present invention.

As shown in FIG. 12, the high camera view 1150 can encompass expected locations of the label across different container types, which can include having a camera view that covers an area having a height of 48 inches and width of 26 inches. The high camera view 1150 need not be from a camera positioned high above the items, but can be a high angle view, a down-angle view, or other view desired to have the desired field of view. Other sized areas with differing dimensions can be used. As shown in FIG. 13, the high camera view 1150 can be configured differently if the expected label positioning is confined to a smaller area. For example, the high camera view 1150 shown in FIG. 13 is smaller, covering an area with a height of 16 inches and width of 16 inches, because the expected label positioning area relating to only one container type is needed.

As previously explained elsewhere herein, the camera system 233 can communicate the code on the label 1151 to the system hub 110. The work management system 100 can determine the identity of the item based on the code of the label 1151 and summon an AGV to transport the item, as required, according to a facility plan or routing plan for that item. In some embodiments, the work management system 100 can use information from the camera system 233 and the ultrasonic sensor system 231/931 together to determine the occupancy of a pick/drop location and the identity of an occupying item, which can be used to direct an AGV to transport the item according to a facility plan or routing plan for that item. In some embodiments, the AGV has a camera that can detect (e.g., read) a label 1151 and/or tow device 1106.

FIG. 15 shows an exemplary message-passing diagram for controlling AGVs in embodiments described herein. As shown in FIG. 2, the system hub 110 can be in communication with AGV translation database 114 assisting in communication between the system hub 110 and the various AGVs. In some embodiments, the system hub 110 can communicate with AGV translation database 114 by means of an API with various defined messages. FIG. 9 displays embodiments of message flow for these messages. However, it is to be understood that many potential message flows can be possible. In some embodiments, the messages are formatted in in XML, with a UTF-8 encoding. In some embodiments, both system hub 110 and AGV translation database 114 will have certain data known to both systems. In some embodiments, this data includes pick locations, drop locations, vehicles along with associated vehicle type such as forklift or tugger, vehicle state IDs, such as low battery, and selected error codes.

In FIG. 9, the message flow begins with the system hub 110 sending a material move request to the AGV translation database 114. In some embodiments, this communication event will occur when material is ready to be moved from one pick location to another drop location. The system hub 110 can determine this in the manners previously described. In some embodiments, this message will instead be two sequential messages. The first message is sent from the system hub 110 to AGV translation database 114 containing the pick location, drop location, and finishing station. Immediately following the first message, AGV translation database 114 will send system hub 110 an ACK message containing the same data. The ACK will simply confirm that the message has been received by AGV translation database 114; it does not indicate that the message has been acted on, or that a vehicle has been sent. In some embodiments, the first message can be structured using the following XML:

```
<materialMoveRequest>
  <objectName>materialMoveRequest</objectName>
  <requestId>Request</requestId>
```

-continued

```
<bodyType>GT10,GP8</bodyType>
<zone>ZoneId</zone>
<pickName>LocationId</pickName>
<dropName>LocationId</dropName>
<endName>LocationId</endName>
</materialMoveRequest>
```

The ACK message can take the form:

```
<materialMoveRequestACK>
  <objectName>materialMoveRequestACK</objectName>
  <confirmation>{{True}}</confirmation>
  <queueLength>{{Length}}</queueLength>
  <requestId>{{Request}}</requestId>
  <bodyType>{{bodyType}}</bodyType>
  <pickName>{{LocationId}}</pickName>
  <dropName>{{LocationId}}</dropName>
  <endName>{{LocationId}}</endName>
</materialMoveRequestACK>
```

In some embodiments, the Body Type, Pick-up Name, Drop-off Name, and End Station data types are defined by vehicle segments, stations, picks, drops, and routes. In some embodiments, the system hub 110 must have this data and send the data to the AGV translation database 114. In some embodiments, the AGV translation database 114 will provide a 5-6 digit number unique to the work, mission, or operation.

In some embodiments, the next message is the Vehicle Matched with Work message sent from the AGV translation database 114 to system hub 110. In some embodiments, this message will be sent when AGV translation database 114 has matched a vehicle with requested work. AGV translation database 114 will then dispatch that vehicle to the pick location associated with that work, and send a message to the system hub 110 confirming that the work is being fulfilled.

In some embodiments, the Vehicle Matched with Work message can be structured using the following XML:

```
<?xml version="1.0" encoding="UTF-8" standalone="yes"?>
<vehicleMatchedWithWork>
  <objectName>vehicleMatchedWithWork</objectName>
  <requestId>{{Request}}</requestId>
  <vehicle>{{Vehicle Name}}</vehicle>
  <bodyType>{{GT10,GP8}}</bodyType>
  <eta>{{eta}}</eta>
</vehicleMatchedWithWork>
```

In some embodiments, the AGV translation database 114 will know all of the above data at the time the message is sent.

In some embodiments, the next message sent can be a Fleet Status Update. In some embodiments, the Fleet Status Update will be sent by the AGV translation database 114 to system hub 110 periodically. The data in the message will represent a real-time over view of each AGV connected to AGV translation database 114.

In some embodiments, the Fleet Status Update can be structured using the following XML:

```
<?xml version="1.0" encoding="UTF-8" standalone="yes"?>
<fleetStatusUpdate>
  <objectName>fleetStatusUpdate</objectName>
  <vehicles>
```

-continued

```
    <vehicleItem>
    <vehicle>{{Vehicle Name}}</vehicle>
    <destination>{{Station}}</destination>
    <state>{{State}}</state>
    <eta>{{eta}}</eta>
    </vehicleItem>
    <vehicleItem>...</vehicleItem>
    </vehicles>
</fleetStatusUpdate>
```

In some embodiments, the next message sent is an "Error—with Assigned Work" message. When a vehicle is performing work and goes into an error state for a configurable amount of time, AGV translation database 114 will send a message to the system hub 110 containing the vehicle and error state that occurred. In some embodiments, the error codes can be defined by the system hub 110. In some embodiments, the Error—with Assigned Work message can be structured using the following XML:

```
<?xml version="1.0" encoding="UTF-8" standalone="yes"?>
<vehicleError>
  <objectName>vehicleError</objectName>
  <vehicle>{{VehicleName}}</vehicle>
  <errorCode>{{ErrorCode}}</errorCode>
  <location>{{StationNumber}}</location>
  <time>{{YYYY/MM/DD HH:MM:SS TMZ}}</time>
</vehicleError>
```

In some embodiments, the next message sent is a "Successful Pick Up" message. In some embodiments, this message will be sent from AGV translation database 114 to the system hub 110 when an AGV has successfully picked up an item. This message only confirms that material is on the vehicle, and does not reflect that the AGV has finished its mission. In some embodiments, the Successful Pick Up message can be structured using the following XML:

```
<?xml version="1.0" encoding="UTF-8" standalone="yes"?>
<successfulPickup>
  <objectName>successfulPickup</objectName>
  <requestId>{{Request}}</requestId>
  <vehicle>{{VehicleName}}</vehicle>
  <bodyType>{{GT10,GP8}}</bodyType>
  <pickName>{{LocationId}}</pickName>
  <time>{{YYYY/MM/DD HH:MM:SS TMZ}}</time>
</successfulPickup>
```

In some embodiments, the next message sent is a "Successful Drop" message. This message is sent from AGV translation database 114 to the system hub 110 when an AGV has successfully dropped an item. This message only confirms that material has been delivered to a location, and does not reflect that the vehicle has done anything further.

In some embodiments, the next message sent is an "Error—without Assigned Work" message. When a vehicle is not performing work and goes into an error state for a configurable amount of time, AGV translation database 114 will send a message to the system hub 110 identifying the vehicle and error state that occurred. In some embodiments, the error codes can be defined by the system hub 110. In some embodiments, the Error—without Assigned Work message can be structured using the following XML:

```
<?xml version="1.0" encoding="UTF-8" standalone="yes"?>
<vehicleError>
  <objectName>vehicleError</objectName>
  <requestID>{{Request}}</requestID>
  <vehicle>{{VehicleName}}</vehicle>
  <errorCode>{{ErrorCode}}</errorCode>
  <location>{{StationNumber}}</location>
  <time>{{YYYY/MM/DD HH:MM:SS TMZ}}</time>
</vehicleError>
```

In some embodiments, the next message sent is a "Ready for Battery Charge" message. In some embodiments, AGV translation database 114 will determine when an AGV has a low battery and must be sent to the battery charging area. When the vehicle arrives at the charging area, AGV translation database 114 will send a message to the system hub 110 indicating that an AGV is ready for battery charge. The system hub 110 will be able to send this message to alert facility workers of the battery charge. In some embodiments, the Ready for Battery Charge message can be structured using the following XML:

```
<?xml version="1.0" encoding="UTF-8" standalone,"yes"?>
<batteryChargeComplete>
  <objectName>batteryChargeComplete</objectName>
  <vehicle>{{VehicleName}}</vehicle>
  <time>{{YYYY/MM/DD HH:MM:SS TMZ}}</time>
</batteryChargeComplete>
```

In some embodiments, the next message sent is a "Battery Charge Complete" message. In some embodiments, once the AGV has been charged, a facility worker can remove it from the charging station. The AGV translation database 114 will send a message to the system hub 110 indicating that the AGV is fully charged. In some embodiments, the Battery Charge Complete message can be structured using the following XML:

```
<?xml version="1.0" encoding="UTF-8" standalone,"yes"?>
<batteryChargeComplete>
  <objectName>batteryChargeComplete</objectName>
  <vehicle>{{VehicleName}}</vehicle>
  <time>{{YYYY/MM/DD HH:MM:SS TMZ }}</time>
</batteryChargeComplete>
```

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A system comprising:

a sensor system configured to detect one or more item containers for transport occupying an area of a distribution facility;

a communication module configured to receive a request for an automated guided vehicle (AGV) to retrieve the one or more detected item containers; and one or more processors in communication with the sensor system and the communication module, the one or more processors configured to:

identify a first AGV of a plurality of AGVs to retrieve the one or more detected item containers;

determine a potential route for the first AGV;

determine if the potential route conflicts with a route of a second AGV of the plurality of AGVs;

in response to determining that the potential route of the first AGV conflicts with the route of the second AGV, determine a priority between the potential route of the first AGV and the route of the second AGV;

in response to determining that the potential route of the first AGV has a lower priority compared to the route of the second AGV, determine a new route for the first AGV that does not conflict with the route of the second AGV.

2. The method of claim 1, wherein the one or more processors are configured to identify the first AGV of the plurality of AGVs to retrieve the one or more detected item containers by identifying an unoccupied AGV of the plurality of AGVs that is closest to the area.

3. The method of claim 1, wherein the one or more processors are configured to determine the priority between the potential route of the first AGV and the route of the second AGV based on an item characteristic of one or more items in the detected one or more item containers.

4. The method of claim 1, wherein the one or more processors are configured to determine the potential route for the first AGV by combining preprogrammed route legs.

5. The method of claim 1, wherein the one or more processors are configured to determine the potential route for the first AGV by determining a shortest route length.

6. The method of claim 1, wherein the one or more processors are configured to determine the priority between the potential route of the first AGV and the route of the second AGV by comparing a delivery urgency of the one or more detected item containers and a delivery urgency of an item container corresponding to the second AGV.

7. The method of claim 1, wherein the one or more processors are configured to determine the priority between the potential route of the first AGV and the route of the second AGV by determining if the first AGV has traveled farther along the potential route compared to the second AGV along the route.

8. The method of claim 1, wherein the sensor system is configured to determine a type of the one or more detected item containers and the one or more processors are configured to determine a type of AGV that is configured to retrieve the determined type of the one or more detected item containers.

9. The method of claim 8, wherein the first AGV is the determined type of AGV.

10. A method comprising:

scanning, with a sensor, an area of a distribution facility to detect one or more item containers for transport occupying the area;

receiving, with a communication module, a request for an automated guided vehicle (AGV) to retrieve the one or more detected item containers;

identifying, with one or more processors, a first AGV of a plurality of AGVs to retrieve the one or more detected item containers;

determining, with the one or more processors, a potential route for the first AGV;

determining, with the one or more processors, if the potential route conflicts with a route of a second AGV of the plurality of AGVs;

in response to determining that the potential route of the first AGV conflicts with the route of the second AGV, determining a priority between the potential route of the first AGV and the route of the second AGV;

in response to determining that the potential route of the first AGV has a lower priority compared to the route of the second AGV, determining a new route for the first AGV that does not conflict with the route of the second AGV.

11. The method of claim 10, wherein the identifying the first AGV of the plurality of AGVs to retrieve the one or more detected item containers comprises identifying an unoccupied AGV of the plurality of AGVs that is closest to the area.

12. The method of claim 10, wherein the identifying the first AGV of the plurality of AGVs to retrieve the one or more detected item containers comprises identifying an unoccupied AGV of the plurality of AGVs that comprises a certain speed capacity.

13. The method of claim 10, wherein the determined the priority between the potential route of the first AGV and the route of the second AGV is based on an item characteristic of one or more items in the detected one or more item containers.

14. The method of claim 10, wherein the determining the potential route for the first AGV comprises combining preprogrammed route legs.

15. The method of claim 10, wherein the determining the potential route for the first AGV comprises determining a shortest route length.

16. The method of claim 10, wherein the determining the priority between the potential route of the first AGV and the route of the second AGV comprises comparing a delivery urgency of the one or more detected item containers and a delivery urgency of an item container corresponding to the second AGV.

17. The method of claim 10, wherein the determining the priority between the potential route of the first AGV and the route of the second AGV comprises determining whether the potential route of the first AGV is longer than a remainder of the route of the second AGV.

18. The method of claim 10, further comprising determining a type of the one or more detected item containers and determining a type of AGV that is configured to retrieve the determined type of the one or more detected item containers.

19. The method of claim 18, wherein the first AGV is the determined type of AGV.

20. The method of claim 19, wherein the determined type of AGV is a forklift type AGV.

* * * * *